United States Patent
Hisada

(10) Patent No.: US 11,107,231 B2
(45) Date of Patent: Aug. 31, 2021

(54) OBJECT DETECTION DEVICE, OBJECT DETECTION METHOD, AND OBJECT DETECTION PROGRAM

(71) Applicant: NEC Corporation, Tokyo (JP)

(72) Inventor: Daichi Hisada, Tokyo (JP)

(73) Assignee: NEC CORPORATION, Tokyo (JP)

(*) Notice: Subject to any disclaimer, the term of this patent is extended or adjusted under 35 U.S.C. 154(b) by 71 days.

(21) Appl. No.: 16/483,791

(22) PCT Filed: Mar. 13, 2018

(86) PCT No.: PCT/JP2018/009643
§ 371 (c)(1),
(2) Date: Aug. 6, 2019

(87) PCT Pub. No.: WO2018/173846
PCT Pub. Date: Sep. 27, 2018

(65) Prior Publication Data
US 2019/0392606 A1 Dec. 26, 2019

(30) Foreign Application Priority Data
Mar. 22, 2017 (JP) .............................. JP2017-055679

(51) Int. Cl.
*G06T 7/70* (2017.01)
*G06T 7/00* (2017.01)

(52) U.S. Cl.
CPC .............. *G06T 7/70* (2017.01); *G06T 7/97* (2017.01); *G06T 2207/20004* (2013.01); *G06T 2207/20016* (2013.01); *G06T 2207/20081* (2013.01)

(58) Field of Classification Search
CPC ... G06T 7/70; G06T 7/97; G06T 2207/20004; G06T 2207/20016; G06T 2207/20081;
(Continued)

(56) References Cited

U.S. PATENT DOCUMENTS 6,578,017 B1 * 6/2003 Ebersole ................... G06T 7/00
706/3
9,456,170 B1 * 9/2016 Miller ....................... G06K 9/72
(Continued)

FOREIGN PATENT DOCUMENTS

JP     2000206029    *   7/2000  ............. G01B 11/28
JP     2009-140369 A     6/2009
(Continued)

OTHER PUBLICATIONS

International Search Report for PCT Application No. PCT/JP2018/009643, dated Jun. 12, 2018.

*Primary Examiner* — Sumati Lefkowitz
*Assistant Examiner* — Dalen O Goodson
(74) *Attorney, Agent, or Firm* — Sughrue Mion, PLLC

(57) ABSTRACT

An object detection device equipped with: a first object detection unit that uses a predetermined prediction model to acquire, from a known first image for which the coordinates of a detection subject are known, a confidence value with respect to each detection region extracted from a plurality of positions in the first image; a parameter determination unit that, on the basis of the acquired confidence value, determines parameters that include a detection threshold value which is a threshold value with respect to the confidence value; and a second object detection unit that uses the prediction model to acquire a confidence value with respect to each detection region extracted from the narrowed-down detection region candidates, and detects the detection subject on the basis of the acquired confidence value.

20 Claims, 13 Drawing Sheets

(58) Field of Classification Search
CPC .............. G06K 9/00624; G06K 9/3233; G06F 16/5854; G06F 16/55
See application file for complete search history.

(56) References Cited

U.S. PATENT DOCUMENTS

| | | | |
|---|---|---|---|
| 2008/0317129 A1* | 12/2008 | Lertrattanapanich | H04N 19/14 375/240.16 |
| 2013/0322691 A1 | 12/2013 | Guan | |
| 2015/0169941 A1* | 6/2015 | Steinberg | G06K 9/46 382/203 |
| 2015/0343948 A1 | 12/2015 | Miyagawa | |
| 2015/0371397 A1* | 12/2015 | Wang | G06K 9/4652 382/159 |
| 2016/0379075 A1 | 12/2016 | Ando | |

FOREIGN PATENT DOCUMENTS

| | | | | |
|---|---|---|---|---|
| JP | WO-2013136395 | * | 9/2013 | .............. G06T 7/20 |
| JP | 2014-211854 A | | 11/2014 | |
| JP | 2015-001966 A | | 1/2015 | |
| JP | 2015-049702 A | | 3/2015 | |
| JP | 2015104016 | * | 6/2015 | ............. H04N 5/232 |
| JP | 2015-177300 A | | 10/2015 | |
| KR | 101473991 | * | 12/2014 | .............. G06K 9/46 |
| WO | 2014/103433 A1 | | 7/2014 | |

* cited by examiner

| GRANULARITY t | SLIDING WIDTH | | REGION THRESHOLD a | DETECTION COUNT count | DETECTION THRESHOLD th |
|---|---|---|---|---|---|
| | WIDTH SW | HEIGHT SH | | | |
| 1 | 0.5W | 0.5H | 0.5 | 100 | 0.56 |
| 2 | 0.25W | 0.25H | 0.75 | 80 | 0.73 |
| 3 | 0.125W | 0.125H | 0.875 | 40 | 0.81 |
| ⋮ | ⋮ | ⋮ | ⋮ | ⋮ | ⋮ |
| N | $(0.5)^N W$ | $(0.5)^N H$ | $1-(0.5)^N$ | 5 | 0.99 |
| | | | TOTAL DETECTION COUNT | 300 | |
| | | | Dcount | 100 | |

FIG. 7

| | AVERAGE DETECTION COUNT (100) | | AVERAGE DETECTION COUNT (100) | | AVERAGE DETECTION COUNT (100) | |
|---|---|---|---|---|---|---|
| | TOTAL(300) | | | | | |
| | t1_count | | t2_count | t3_count | t4_ | |
| | | | ↑ LEVEL BOUNDARY | | ↑ LEVEL BOUNDARY | → DETECTION COUNT |

| GRANULARITY t | SLIDING WIDTH | | REGION THRESHOLD a | DETECTION COUNT count | DETECTION THRESHOLD th | |
|---|---|---|---|---|---|---|
| | WIDTH SW | HEIGHT SH | | | | |
| 1 | 0.5W | 0.5H | 0.5 | 100 | 0.56 | ← j=1 |
| 2 | 0.25W | 0.25H | 0.75 | 80 | 0.73 | |
| 3 | 0.125W | 0.125H | 0.875 | 40 | 0.81 | ← j=2 |
| ⋮ | ⋮ | ⋮ | ⋮ | ⋮ | ⋮ | |
| N | $(0.5)^N W$ | $(0.5)^N H$ | $1-(0.5)^N$ | 5 | 0.99 | |
| | | | TOTAL DETECTION COUNT | 300 | | |
| | | | Dcount | 100 | | |

OBJECT DETECTION DEVICE, OBJECT DETECTION METHOD, AND OBJECT DETECTION PROGRAM

This application is a National Stage Entry of PCT/JP2018/009643 filed on Mar. 13, 2018, which claims priority from Japanese Patent Application 2017-055679 filed on Mar. 22, 2017, the contents of all of which are incorporated herein by reference, in their entirety.

TECHNICAL FIELD

The present invention relates to an object detection device, an object detection method, and an object detection program that detects a predetermined target object from an image.

BACKGROUND ART

In recent years, a technique for detecting a target object from a randomly chosen image by using a technique for classifying images based on supervised machine learning has been widely used. In this technique, detection accuracy is increased, for example, by a method in which a region frame called a sliding window is used to extract, as detection regions, regions smaller than an image region of a detection image from an image to be detected (hereinafter, referred to as a "detection image"), and an image classification is performed on the regions thus extracted.

Machine learning is a type of artificial intelligence and is an algorithm that provides a computer with the ability to "learn". Machine learning is used to analyze human-made sample data (training data with correct labels) to build a prediction model. Machine learning that uses such sample data to build a prediction model is generally called "supervised machine learning". The use of such a prediction model makes it possible to obtain, for example, a probability that which label data with no correct label (what data represents is unknown) belongs to or a probability for each label, and thus makes it possible to make predictions about future values.

In an object detection system, a detection region nearly as large as a target object to be detected is defined in a detection image, and a determination is made whether the target object exists in the detection region by using a learned prediction model while shifting the detection region.

For example, when a detection region that splits the target object into two pieces is defined in the image, it is likely that a determination is made that no target object exists in the detection region. In order to eliminate such a detection failure, a determination may be made whether the target object exists in the detection region while shifting the detection region up, down, left, and right little by little across the image, but the determination processing needs to be performed each time the detection region is shifted, and, as a result, the larger the number of shift operations is, the more time is taken for detection processing on one image. On the other hand, in order to reduce the time taken for the detection processing, the number of determinations may be reduced by, for example, shifting the detection region to a greater extent, but the larger the shift distance is, the higher the probability of a failure to capture the target object becomes, and in turn the greater the risk of the detection failure becomes.

Furthermore, when the shift distance is made too small, the number of detection regions overlapping each other within the detection image increases. This increases the possibility that a determination is made that the target object exists in a large number of detection regions that are slightly different from each other in position of the same object. At this time, even when such an object is not the target object, erroneous detection may be made because, for example, the detection region contains only part of the object. As described above, the smaller a sliding width is, the higher the probability that non-target object is erroneously determined to be the target object, which in turn may increase the number of times of erroneous detection and deteriorates detection accuracy. In order to prevent such a situation, it is conceivable that a threshold (a threshold for determining the target object) of a classification result from machine learning is increased, but the greater the threshold is, the higher the probability of the detection failure of the target object becomes.

As described above, the shift distance in each direction of the detection region across the image (hereinafter, collectively referred to as a sliding width) is a parameter that greatly affects detection processing throughput and detection accuracy. It is, however, difficult to set such a parameter to a value that leads to an increase in accuracy of detection on a randomly chosen image and an increase in efficiency of detection processing. For example, trial and error such as setting the parameter to an appropriate value through repeated detection processing while adjusting the sliding width on some images is required.

As a method of achieving both accuracy of recognition of the target object and a reduction in computational complexity, for example, Patent Literature 1 discloses a method of recognizing the target object by simple primary recognition processing and determining, on the basis of a result of the recognition, a position and scale (size) of a to-be-scanned region for secondary recognition processing that is relatively high in computational complexity. More specifically, the method disclosed in Patent Literature 1 uses the result of the primary recognition processing of determining whether the target object exists in a designated region while changing the position or scale of the to-be-scanned region to determine the position and scale of the to-be-scanned region for the secondary recognition processing so as to cover almost the whole of the target object. This prevents, even when a plurality of region candidates that are slightly different from each other in position of the same target object and the like are extracted, substantially unnecessary computation from being performed on the same target object in the secondary recognition processing, which achieves both the accuracy of recognition and the reduction in computational complexity.

Further, for example, Patent Literature 2 discloses a method of defining a threshold of reliability for distinguishing between a region to be a candidate of an image region belonging to a category to be recognized (for example, a pedestrian or the like) and a background image and outputting only a region having reliability equal to or greater than the threshold. Of the method disclosed in Patent Literature 2, a description has been given that when candidates whose number is greater than a predetermined maximum number have been detected during execution of the above processing, the threshold of reliability is redefined to be higher so as to allow the number of candidates to fall within the maximum number.

CITATION LIST

Patent Literature

Patent Literature 1: International Publication WO 2014/103433

Patent Literature 2: Japanese Patent Application Laid-Open No. 2015-049702

SUMMARY OF INVENTION

Technical Problem

The method disclosed in Patent Literature 1 requires that unsupervised machine learning be performed twice in the primary recognition processing and the secondary recognition processing on one detection image and further requires that the target object be detected without failure in the primary recognition processing. As described above, in order to make a determination of whether the target object exists with high accuracy in the primary recognition processing that is unsupervised machine learning, the sliding width and the size of the detection region need to be appropriately set. However, no consideration has been given to the achievement of both the accuracy of recognition of the target object and the reduction in computational complexity in Patent Literature 1. Therefore, the same problem as described above occurs in the setting of the sliding width in the primary recognition processing.

Further, the method disclosed in Patent Literature 2 requires that the maximum number be set appropriately. However, for example, in a system where the sliding width is changed on an as-needed basis, the total number of detection regions varies depending on the sliding width, which makes it difficult to set the maximum number appropriately. As described above, with the method of determining the threshold of reliability on the basis of a detection count, it is not possible to set the threshold suitable for the sliding width.

The present invention has been made in view of the above-described problem, and it is an object of the present invention to increase efficiency of detection processing without a reduction in detection accuracy when detecting a predetermined target object from a randomly chosen image by using a prediction model.

Solution to Problem

An image detection device according to the present invention includes a first object detection means configured to use a predetermined prediction model to acquire, from a known first image for which the coordinates of a detection subject are known, a confidence value with respect to each detection region extracted from a plurality of positions in the first image and indicating certainty that the detection subject exists in the detection region, a parameter determination means configured to, on the basis of the acquired confidence value, determine parameters that include a detection threshold value which is a threshold value with respect to the confidence value, said parameters being used when detecting the detection subject from a second image in which it is not known whether the detection subject exists, and a second object detection means configured to, on the basis of the determined parameters, narrow down detection region candidates to be used as detection region extraction sources from the entire region of a second image, and then use the prediction model to acquire a confidence value with respect to each detection region extracted from the narrowed-down detection region candidates, and detect the detection subject on the basis of the acquired confidence value.

Further, an image detection method according to the present invention includes using a predetermined prediction model to acquire, from a known first image for which the coordinates of a detection subject are known, a confidence value with respect to each detection region extracted from a plurality of positions in the first image and indicating certainty that the detection subject exists in the detection region, on the basis of the acquired confidence value, determining parameters that include a detection threshold value which is a threshold value with respect to the confidence value, said parameters being used when detecting the detection subject from a second image in which it is not known whether the detection subject exists, on the basis of the determined parameters, narrowing down detection region candidates to be used as detection region extraction sources from the entire region of a second image, using the prediction model to acquire a confidence value with respect to each detection region extracted from the narrowed-down detection region candidates, and detecting the detection subject on the basis of the acquired confidence value.

Further, an image detection program according to the present invention causes a computer to execute first object detection processing of using a predetermined prediction model to acquire, from a known first image for which the coordinates of a detection subject are known, a confidence value with respect to each detection region extracted from a plurality of positions in the first image and indicating certainty that the detection subject exists in the detection region, parameter determination processing of, on the basis of the acquired confidence value, determining parameters that include a detection threshold value which is a threshold value with respect to the confidence value, said parameters being used when detecting the detection subject from a second image in which it is not known whether the detection subject exists, and second object detection processing of, on the basis of the determined parameters, narrowing down detection region candidates to be used as detection region extraction sources from the entire region of a second image, using the prediction model to acquire a confidence value with respect to each detection region extracted from the narrowed-down detection region candidates, and detecting the detection subject on the basis of the acquired confidence value.

Advantageous Effects of Invention

According to the present invention, it is possible to increase, when detecting a predetermined target object from a randomly chosen image by using the prediction model, efficiency of detection processing without a reduction in detection accuracy.

BRIEF DESCRIPTION OF DRAWINGS

FIG. 7 is an explanatory diagram schematically showing a method of determining granularity $t_j$ based on the average detection count DCount for the detection granularity.

DESCRIPTION OF EMBODIMENTS

Exemplary Embodiment 1

Figure 1:
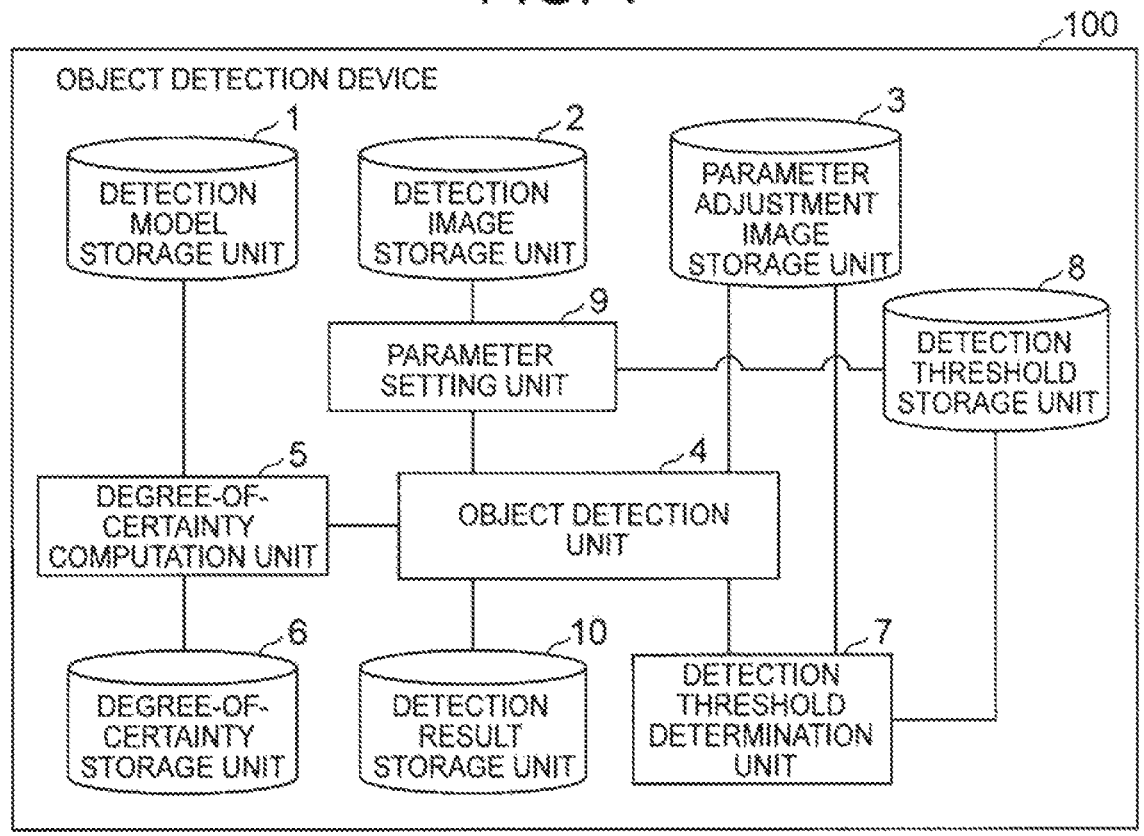
FIG. 1 is a block diagram showing an example of an object detection device 100 of a first exemplary embodiment.

Hereinafter, a description will be given of exemplary embodiments of the present invention with reference to the drawings. FIG. 1 is a block diagram showing an example of an object detection device 100 of a first exemplary embodiment. As shown in FIG. 1, the object detection device 100 includes a detection model storage unit 1, a detection image storage unit 2, a parameter adjustment image storage unit 3, an object detection unit 4, a degree-of-certainty computation unit 5, a degree-of-certainty storage unit 6, a detection threshold determination unit 7, a detection threshold storage unit 8, a parameter setting unit 9, and a detection result storage unit 10.

The detection model storage unit 1 stores a learned machine learning model (prediction model) to be used in object detection.

The detection image storage unit 2 stores a detection image. One or a plurality of detection images may be stored in the detection image storage unit 2.

The parameter adjustment image storage unit 3 stores a parameter adjustment image that is an image to be used in determination of a window configuration parameter. One or a plurality of parameter adjustment images may be stored in the parameter adjustment image storage unit 3. Herein, the parameter adjustment image is, for example, an image containing a target object as a subject. Note that it is more preferable that the parameter adjustment image contains a target object nearly as large as a target object to be detected from the detection image. The parameter adjustment image is used as training data in supervised machine learning (to be described later). The parameter adjustment image storage unit 3 stores, for example, at least one parameter adjustment image and coordinates (hereinafter, referred to as "correct coordinates") of a region where the target object exists in each parameter adjustment image.

Herein, the window configuration parameter is a parameter to be used in determination of a detection region to be passed to machine learning, and contains at least information representing a sliding width and a detection threshold associated with the sliding width to be used. According to the present exemplary embodiment, an index called "granularity" is used as an identifier for identifying the sliding width.

The granularity is an index indicating a degree of fineness to which the detection region is extracted, in object detection processing (to be described later), from an image to be subjected to the object detection processing. According to the present exemplary embodiment, the larger a value corresponding to the granularity is, the smaller the sliding width becomes, that is, the smaller a shift distance becomes, and, accordingly, the higher the frequency of extracting the detection region becomes. Note that, although a term "number of levels of granularity" may be used in the following description, the "number of levels" denotes how many levels of granularity (the number of levels of granularity) are used for each object detection processing. Further, when a term "next level" is used for granularity, the term denotes the second highest level of granularity after currently set granularity. Further, for example, "granularity level 1" denotes the coarsest (lowest) level of granularity among the levels of granularity to be used.

Further, the detection threshold serves as a criterion for a confidence value serving as an index indicating certainty that the target object exists in the detection region output from the degree-of-certainty computation unit 5 (to be described later), the criterion being used in determination of whether the target object exists in the detection region in the subsequent processing. In the subsequent processing, for example, when a confidence value of a certain detection region is equal to or greater than the detection threshold, a determination may be made that the target object exists in the detection region.

The object detection unit 4 performs the object detection processing (to be described later) on an input image. According to the present exemplary embodiment, the object detection unit 4 performs either of the following two types of processing in accordance with the type of the input image.

(1) When the Parameter Adjustment Image is Input (First Object Detection Processing)

The object detection unit 4 shifts a sliding window across the input image by using sliding widths associated with at least two predetermined levels of adjustment granularity t, acquires the confidence value for each detection region based on an output value indicating a classification result from machine learning, and outputs a detection result on the basis of the acquisition result. The object detection unit 4 sends, for each level of granularity t, the confidence value of each detection region as the detection result to the detection threshold determination unit 7.

It is assumed that the adjustment granularity t to be used in the first object detection processing is associated with not only the sliding width but also a region threshold corresponding to the sliding width. The region threshold is a threshold of an actual area occupancy ratio of the target object to the detection region, the threshold being used in determination that each detection region is an object region where an object exists in the first object detection processing. For example, when the region threshold is 0.5, and an object area that is an area (the number of pixels) of a region where the target object actually exists is equal to or greater than 50% of the total area (the number of pixels) of the detection region, the detection region is determined to be the object region.

Note that the detection threshold that is an object detection parameter is adjusted in the subsequent processing on the basis of the confidence value, the correct coordinates, and the region threshold of each detection region that results from supervised machine learning, in the first object detection processing, of the parameter adjustment image that is an image with the correct coordinates.

(2) When the Detection Image is Input (Second Object Detection Processing)

The object detection unit 4 shifts the sliding window across the input image by using the sliding width and the detection threshold indicated by a designated window configuration parameter, acquires the confidence value based on an output value indicating a classification result from machine learning, and output a detection result on the basis of the acquisition result. The object detection unit 4 stores the coordinates of the target object in the detection image as the detection result in the detection result storage unit 10.

Note that, in the first object detection processing and the second object detection processing, as a method of acquiring the confidence value of the detection region, a method of sending an identifier of a target image and coordinates of the detection region to the degree-of-certainty computation unit 5 and acquiring the confidence value of the detection region as a response from the degree-of-certainty computation unit 5.

The degree-of-certainty computation unit 5 performs the following two types of processing on the basis of the coordinates of the detection region and the identifier of the target image sent from the object detection unit 4.

(1) When a Confidence Value of a Detection Region Having Coordinates within a Distance Corresponding to a Shift Threshold R from the Coordinates Thus Sent in the Same Image is Stored in the Degree-of-Certainty Storage Unit 6

The degree-of-certainty computation unit 5 returns the confidence value stored therein.

(2) When No Confidence Value of a Detection Region Having Coordinates within the Distance Corresponding to the Shift Threshold R from the Sent Coordinates in the Same Image is Stored in the Degree-of-Certainty Storage Unit 6

The degree-of-certainty computation unit 5 uses machine learning to compute the confidence value of the detection region having the sent coordinates. The degree-of-certainty computation unit 5 computes the confidence value of the detection region by using a learned machine learning model (prediction model) stored in the detection model storage unit 1 and image data (pixel values and the like) around the coordinates of the detection region.

Typically, such a learned machine learning model outputs a value close to 1 when the input image is similar to a training image; otherwise, the learned machine learning model outputs a value close to 0. The degree-of-certainty computation unit 5 may send the output value of the machine learning to the object detection unit 4 as the confidence value. Further, the degree-of-certainty computation unit 5 stores the confidence value thus computed in the degree-of-certainty storage unit 6 using the identifier of the image and the coordinates of the detection region as a key to prevent redundant computation of the confidence value of a region around the coordinates from being performed in the subsequent processing.

The degree-of-certainty storage unit 6 stores the identifier of the image, and the coordinates and the confidence value of the detection region with the identifier, and the coordinates and the confidence value associated with each other.

Upon receiving the confidence value of each detection region for each level of granularity t for all parameter adjustment images as a result of the first object detection processing from the object detection unit 4, the detection threshold determination unit 7 determines, on the basis of the result and the correct coordinates, a detection threshold Dth(t) for each level of granularity. Further, the detection threshold determination unit 7 computes a detection count count(t) of the object region for each level of granularity on the basis of the detection threshold Dth(t) thus determined.

The detection threshold storage unit 8 stores the detection count count(t) and the detection threshold Dth(t) for each level of granularity computed by the detection threshold determination unit 7.

The parameter setting unit 9, determines, on the basis of the information stored in the detection threshold storage unit 8, detection granularity j that is granularity to be used in the second object detection processing on the detection image and a detection threshold Dth(j) for each level of detection granularity, and sends the detection granularity j and the detection threshold Dth(j) to the object detection unit 4 as the window configuration parameter.

The detection result storage unit 10 stores the result of the second object detection processing. The detection result storage unit 10 stores, for example, an identifier of the detection image and coordinates of the target object detected from the detection image.

Figure 2:
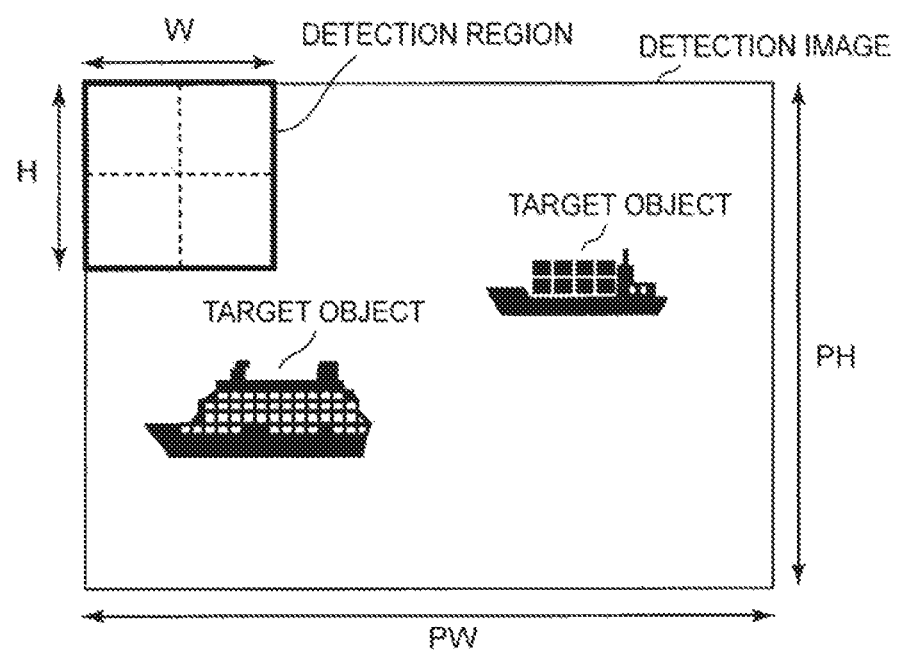
FIG. 2 is an explanatory diagram showing an example of a detection image.

Next, a description will be given of an operation of the present exemplary embodiment. Hereinafter, a description will be given, as an example, of a case where, as shown in FIG. 2, a predetermined target object such as a ship is detected from a detection image such as a satellite image. As shown in FIG. 2, according to the present exemplary embodiment, detection regions smaller in size than the detection image are finely extracted with a sliding window. Then, on the basis of a confidence value for the target object of each of the detection regions thus extracted that results from applying machine learning to each of the detection regions, coordinates of the target object are detected from the detection image.

Hereinafter, as shown in FIG. 2, a width and a height of each detection region are denoted by W and H, respectively, and a width and a height of a whole of the detection image from which the detection regions are extracted are denoted by PW and PH, respectively.

Figure 3:
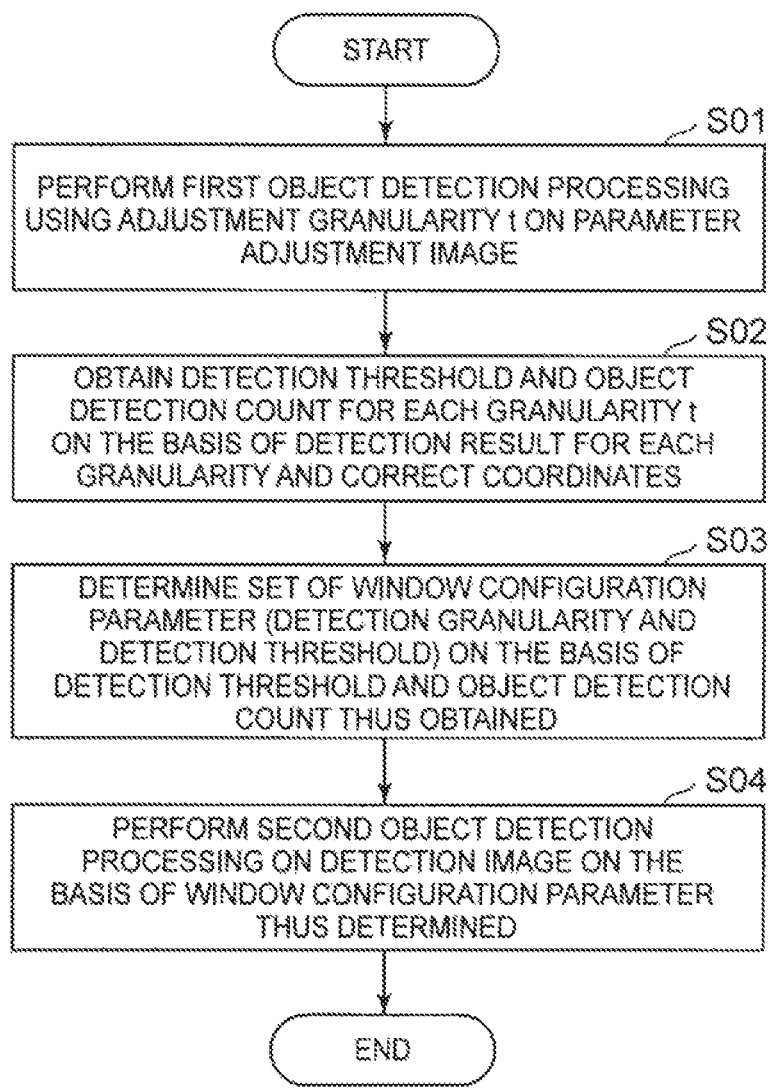
FIG. 3 is a flowchart schematically showing an operation by the object detection device 100 according to the first exemplary embodiment.

First, a description will be given of an outline of an operation of the object detection device 100 of the present exemplary embodiment with reference to FIG. 3. As shown in FIG. 3, first, the object detection device 100 performs the first object detection processing using the adjustment granularity t on the parameter adjustment image (step S01). Herein, the object detection unit 4 and the degree-of-certainty computation unit 5 perform the first object detection processing using the adjustment granularity t to acquire the degrees of certainty of each detection region corresponding to a plurality of types of sliding widths.

Next, the object detection device 100 acquires a detection threshold and an object detection count for each level of granularity t on the basis of the result of step S01 and the correct coordinates attached to the parameter adjustment image (step S02). Herein, the detection threshold determination unit 7 identifies an object region for each level of granularity t on the basis of the confidence value and the correct coordinates of each detection region of each parameter adjustment image, and then obtains the detection threshold and the object detection count for each level of granularity on the basis of the identification result.

Next, the object detection device 100 determines a window configuration parameter to be applied to the detection image on the basis of the result of step S02 (step S03). Herein, the parameter setting unit 9 determines detection granularity j and a detection threshold associated with the detection granularity j that are applied to the detection image on the basis of the detection threshold and the object detection count for each level of granularity obtained by the detection threshold determination unit 7.

Next, the object detection device 100 performs the second object detection processing on the detection image using the detection granularity j and the detection threshold indicated by the window configuration parameter determined in step S03 to detect coordinates of the target object from the detection image (step S04). Herein, the object detection unit 4 performs, on the detection image, processing of detecting the target object by using machine learning while narrowing down a detection target using a designated sliding width and detection threshold. Then, the object detection unit 4 stores, as a detection result, coordinates of the target object in the detection image in the detection result storage unit 10.

Figure 4:
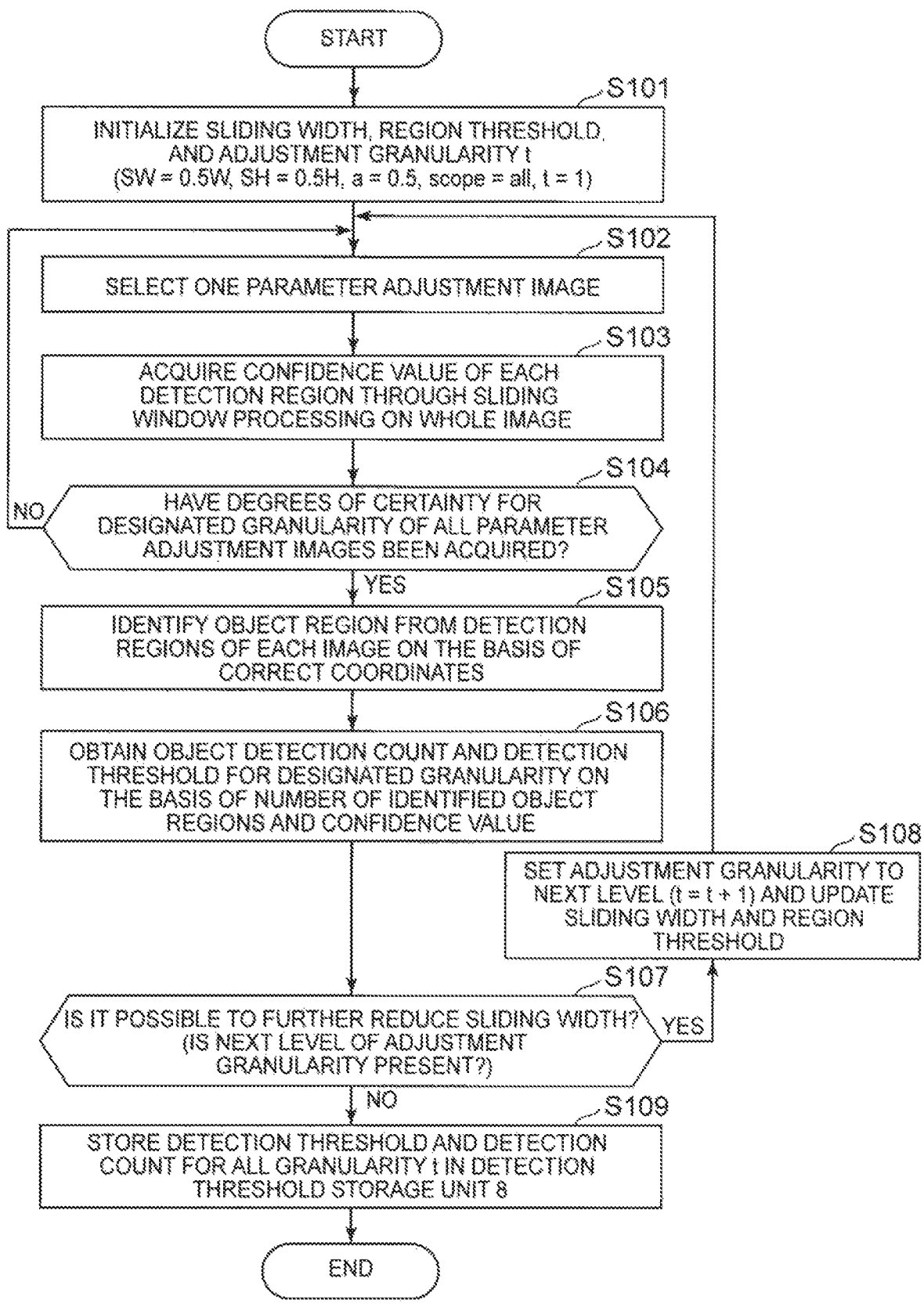
FIG. 4 is a flowchart showing an example of a processing flow of detection threshold adjustment processing of the first exemplary embodiment.

Next, a description will be given in more details of the operation in each of the above steps. First, a description will be given of detection threshold adjustment processing corresponding to the operations in the above step S01 and step S02. FIG. 4 is a flowchart showing an example of a processing flow of the detection threshold adjustment processing.

In the present example, first, the object detection unit 4 performs the first object detection processing. The object detection unit 4 sets, for example, each operation parameter of the first object detection processing to a corresponding initial value (step S101). Upon receiving, for example, the detection region size W, H, initial values $SW_1$ and $SH_1$ of sliding widths SW and SH, and an initial value $a_1$ of a region threshold a to be used in the first object detection processing, the object detection unit 4 sets each operation parameter to a corresponding one of the values thus input. Further, the adjustment granularity t is set to level 1 that is an initial value.

In the example shown below, it is assumed that W, H, $SW_1$ set to 0.5 W, $SH_1$ set to 0.5H, and $a_1$ set to 0.5 are input, and, accordingly, the operation parameters SW, SH, a, and t are set to 0.5 W, 0.5H, 0.5, 1, respectively. Further, scope that denotes a detection range (a range in which the detection regions are extracted) to be used in the object detection processing is set to all that denotes a whole image.

Next, the object detection unit 4 selects one image from the parameter adjustment image storage unit 3 (step S102). Then, the object detection unit 4 acquires the confidence value for the target object of each detection region from the degree-of-certainty computation unit 5 while shifting the detection region by SW and SH within a range indicated by scope across the image thus selected (step S103: sliding window processing). Note that the details of the sliding window processing in step S103 will be described later.

Next, the object detection unit 4 determines whether the confidence value of each detection region for the granularity t has been acquired from all the parameter adjustment images (step S104). When the acquisition has not been completed (No in step S104), the processing returns to step S102, the next parameter adjustment image is selected, and then the same processing is repeated. On the other hand, when the acquisition has been completed (Yes in step S104), the processing proceeds to step S105.

In step S105, the detection threshold determination unit 7 identifies the object region on the basis of the detection result on each parameter adjustment image acquired in step S103 and object coordinates (correct coordinates) stored in the parameter adjustment image storage unit 3. The detection threshold determination unit 7 may compare, for example, the coordinates of the detection region thus set with the correct coordinates for each parameter adjustment image to identify, as an object region, a detection region in which any target object occupies an area equal to or greater than the region threshold a, count detection regions thus identified, and collect degrees of certainty of the detection regions.

Next, the detection threshold determination unit 7 obtains a detection count count(t) and a detection threshold Dth(t) for the granularity t on the basis of the number of the object regions and the degrees of certainty of the object regions thus collected for each of the images (step S106). Herein, of the degrees of certainty collected for all the images, the smallest value is set as the detection threshold Dth(t) for the granularity t, and the total number of the object regions collected for all the images is set as the detection count count(t) for the granularity t. The detection threshold determination unit 7 stores the detection count count(t) and the detection threshold Dth(t) thus obtained in the detection threshold storage unit 8.

Next, the object detection unit 4 determines whether a next level of granularity t is present (step S107). When the next level of granularity t is present (Yes in step S107), that is, the sliding width can be further reduced, the granularity t is set to the next level, and the operation parameters are updated to values associated with the level (step S108). Then, the processing returns to step S102, and the same processing as described above is performed on the next level of granularity (t=t+1). On the other hand, when no next level of granularity t is present, that is, the sliding width cannot be further reduced (No in step S107), the processing proceeds to step S109.

In step S108, the object detection unit 4 may update the operation parameters for the next level to the following values, for example. That is, the sliding width may be reduced by half of the current value, that is, SW is set to $0.5^{t+1}$ W and SH is set to $0.5^{t+1}$H, and the region threshold a may be increased by half of the current value, that is, a is set to $1-0.5^{t+1}$. Note that t may be set to t+1 thereafter.

Then, the same processing as described above is repeated until SW or SH associated with the next level becomes less than 1. Note that, in the above update example, the object detection unit 4 may determine whether the next level of adjustment granularity is present on the basis of whether SW or SH is equal to or less than 2 in step S107. In this configuration, when the current SW or SH is equal to or less than 2, the processing proceeds to step S109; otherwise, the processing proceeds to step S108. Note that the value of each parameter associated with the next level of the granularity t is not limited to the above example.

In step S109, the detection count count(t) and the detection threshold Dth(t) for each level of granularity t are stored in the detection threshold storage unit 8, and the detection threshold adjustment processing is brought to an end.

Figures 5, 6:
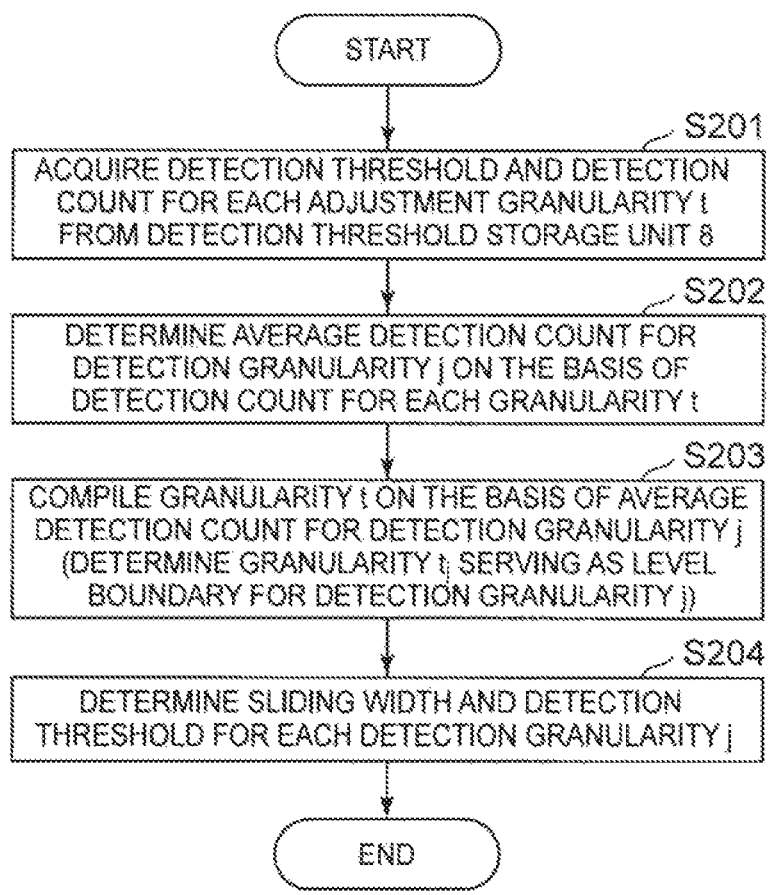
FIG. 5 is a flowchart showing an example of a processing flow of window configuration parameter determination processing of the first exemplary embodiment.
FIG. 6 is an explanatory diagram showing an example of computing an average detection count DCount for detection granularity.

Next, a description will be given of window configuration parameter determination processing corresponding to the above step S03. FIG. 5 is a flowchart showing an example of a processing flow of the window configuration parameter determination processing.

In the example shown in FIG. 5, first, the parameter setting unit 9 retrieves the detection threshold Dth(t) and the detection count count(t) for each level of adjustment granularity t stored in the detection threshold storage unit 8 (step S201).

Next, the parameter setting unit 9 determines an average detection count DCount for the detection granularity j on the basis of the detection count count(t) (step S202). For example, the parameter setting unit 9 may add up the detection counts count(t) for all levels of granularity t and divide the total Σcount by a specific Dt, and take a resultant value as the average detection count DCount for detection granularity. Herein, Dt is a value corresponding to the number of levels of detection granularity, and, in the present example, the number of levels of detection granularity is equal to Dt−1.

FIG. 6 is an explanatory diagram showing an example of computing the average detection count DCount for detection granularity. In FIG. 6, an example of computing the average detection count DCount for detection granularity when Σcount is 300 and Dt is 3 has been given. In this case, DCount is computed to be (Σcount)/Dt=100.

Next, the parameter setting unit 9 determines granularity $t_j$ that serves as a level boundary for the detection granularity j (step S203). The parameter setting unit 9 may compute $t_j$ (j=1, 2, ..., Dt−1), for example, by equally dividing the total Σcount of the detection counts for the granularity t into Dt.

FIG. 7 is an explanatory diagram schematically showing a method of determining the granularity $t_j$ based on the average detection count DCount for detection granularity. As shown in FIG. 7, assuming that positions that result from equally dividing the total Σcount of the detection counts for the detection granularity t into Dt are taken as ideal level boundaries, granularity t closest to each of the positions may be determined to be granularity $t_j$ that serves as a level boundary for the detection granularity j. In the example shown in FIG. 7, granularity $t_1$ corresponding to level 1 (j=1) of detection granularity is determined to be 1, and granularity $t_2$ corresponding to level 2 (j=2) of detection granularity is determined to be 3.

Next, the parameter setting unit 9 determines a sliding width and a detection threshold for each detection granularity j on the basis of the granularity $t_j$ thus determined (step S204). The parameter setting unit 9 may take, for example, granularity $t_j$ as the detection granularity j and take the sliding width and the detection threshold associated with the granularity $t_j$ as a sliding width and a detection threshold for the detection granularity. For example, the parameter setting unit 9 may generate a window configuration parameter containing information representing the granularity $t_j$ taken as the detection granularity j, and information representing SW, SH, and the detection threshold associated with each detection granularity j as information on the detection granularity j.

Figure 8:
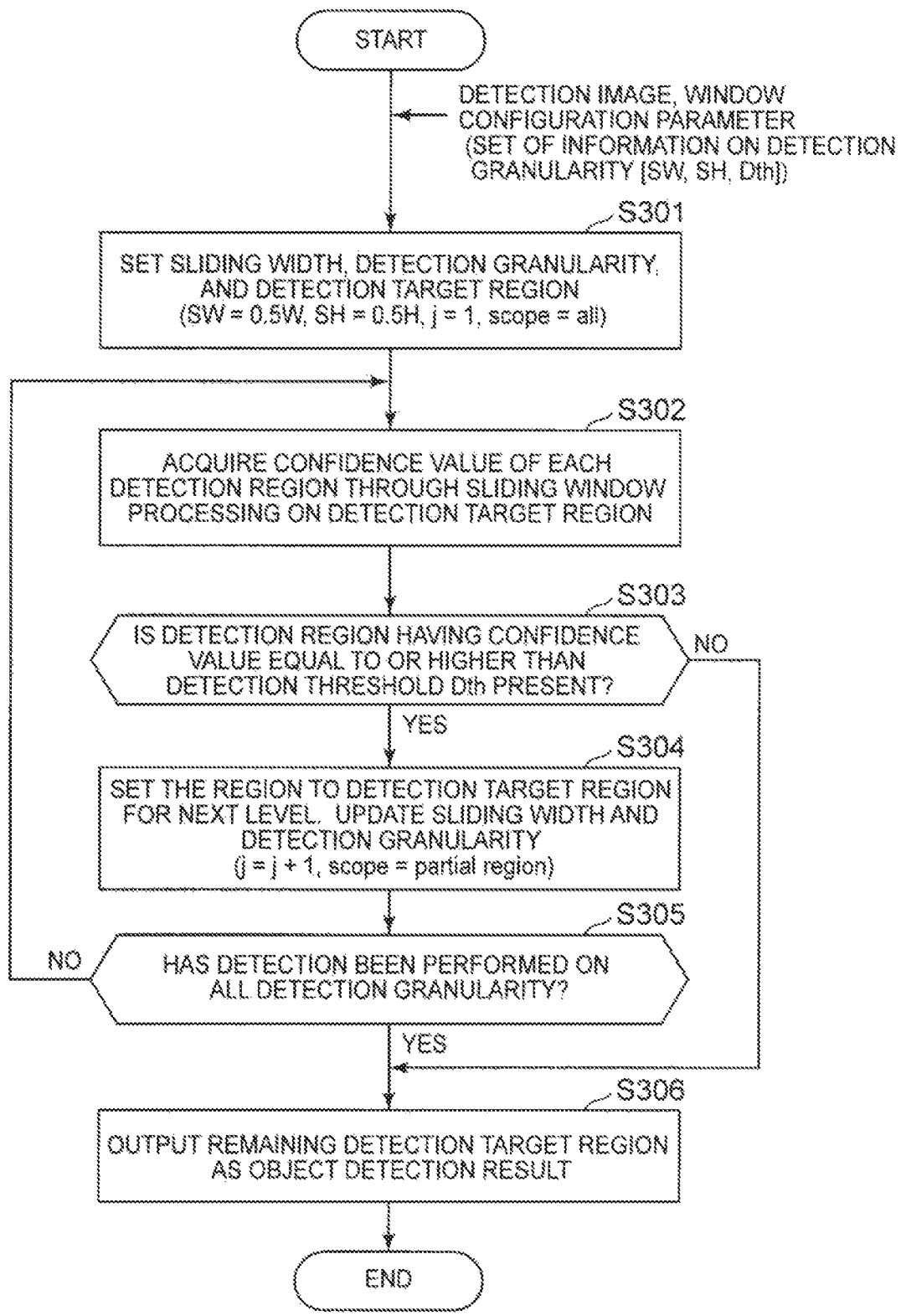
FIG. 8 is a flowchart showing an example of a processing flow of second object detection processing of the first exemplary embodiment.

Next, a description will be given of the second object detection processing corresponding to the above step S04. FIG. 8 is a flowchart showing an example of a processing flow of the second object detection processing.

In the example shown in FIG. 8, it is assumed that first, to the object detection unit 4, the window configuration parameter containing information representing SW, SH, and the detection threshold Dth associated with each detection granularity j that has been determined in the above window configuration parameter determination processing is input together with the detection image. When a plurality of detection images are stored in the detection image storage unit 2, the second object detection processing is invoked at least as many as the number of detection images.

Upon receiving the window configuration parameter, the object detection unit 4 sets each operation parameter of the second object detection processing to a corresponding initial value (step S301). Upon receiving, for example, the detection region size W, H, and a sliding width $SW_j$ and St and a detection threshold Dth(j) associated with each detection granularity j that are to be used in the second object detection processing, the object detection unit 4 set each operation parameter to a corresponding one of the values thus received. At this time, assuming that the detection granularity j is determined to be 1, the object detection unit 4 sets each parameter to a corresponding value associated with the detection granularity j. Note that scope that denotes the detection range in the object detection processing with j determined to be to 1 is set to all that denotes a whole image.

Next, the object detection unit 4 acquires a confidence value for the target object of each detection region from the degree-of-certainty computation unit 5 while shifting the detection region by SW and SH within a range indicated by scope across the detection image thus received (step S302: sliding window processing).

Next, the object detection unit 4 identifies an object region on the basis of a detection result acquired in step S302 and determines a detection range for the next level of granularity (step S303 to step S305).

The object detection unit 4 determines whether a detection region having a confidence value equal to or higher than the detection threshold Dth(j) is present (step S303). When such a detection region is present (Yes in step S303), a whole of the detection region is taken as a detection target region for the next level of detection granularity j (step S304). Otherwise (No in step S303), the processing proceeds to step S306.

In step S304, the detection target region for the next level of detection granularity j is set, and the detection granularity j is updated to the next level (j=j+1). At this time, the other operation parameters SW, SH, and Dth are also updated in sync with the update of the detection granularity j. Further, scope is set to part that denotes a partial region.

Then, the above processing is repeated until the sliding window processing is performed for all levels of detection granularity (No in step S305 causes the processing to return to step S302).

When the sliding window processing has been performed for all levels of detection granularity (Yes in step S305), a detection region left to the end as the detection target region is taken as an object region, and coordinates of the object region are stored in the detection result storage unit 10 (step S306).

Figure 9:
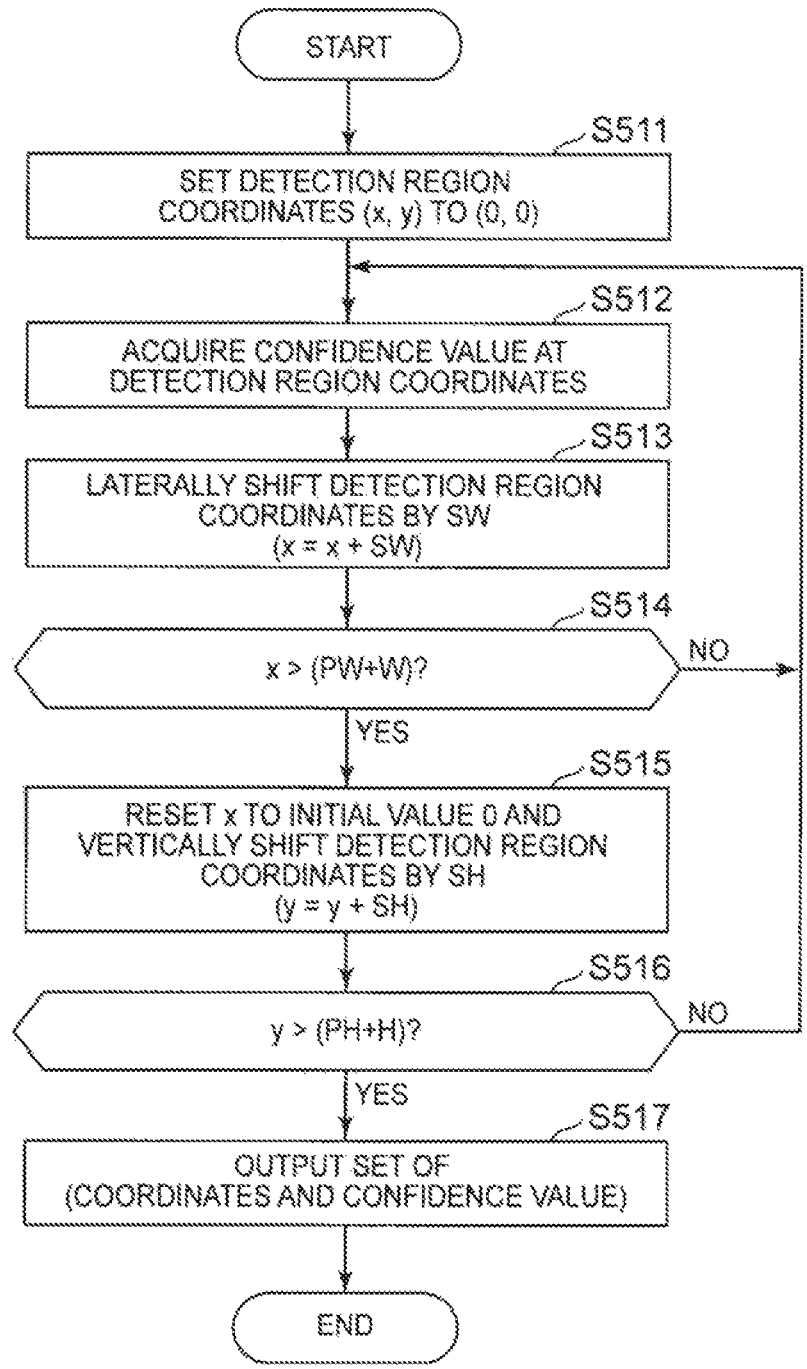
FIG. 9 is a flowchart showing an example of a processing flow of sliding window processing (across an image).

FIG. 9 is a flowchart showing an example of a processing flow of the sliding window processing to be performed by the object detection unit 4. Note that the present example is an example of processing to be invoked when the sliding window processing is performed on the whole image in the above step S103 or step S302.

In the sliding window processing on the whole image, the object detection unit 4 first sets coordinates (x, y) of the detection region to (0, 0) as shown in FIG. 9 (step S511). Herein, the coordinates (x, y) denotes center coordinates of the detection region, but the center coordinates have an error equivalent to the shift threshold R.

Next, the object detection unit 4 passes the coordinates (x, y) to the degree-of-certainty computation unit 5 and acquires a confidence value of the detection region (step S512). Note that a processing flow of degree-of-certainty acquisition processing to be performed by the degree-of-certainty computation unit 5 will be described later.

Next, the object detection unit 4 laterally shifts the coordinates (x, y) of the detection region by SW (step S513). Herein, x may be set to x+SW.

Next, the object detection unit 4 determines whether x is greater than PW+W (step S514). When x is equal to or less than PW+W (No in step S514), the processing returns to step S512, and a confidence value with updated coordinates (x, y) is acquired. On the other hand, when x is greater than PW+W (Yes in step S514), the processing proceeds to step S515 to perform a sliding direction in a vertical direction.

In step S515, the object detection unit 4 resets x to the initial value 0, and vertically shifts the coordinates (x, y) of the detection region by SH. Herein, x may be set to 0, and y may be set to y+SH.

Then, the object detection unit 4 determines whether y is greater than PH+H (step S516). When y is equal to or less than PH+H (No in step S516), the processing returns to step S512, and a confidence value with updated coordinates (x, y) is acquired. On the other hand, when y is greater than PH+H (Yes in step S516), it is determined that the detection processing has been performed on all target regions, and the processing proceeds to step S517.

In step S517, the object detection unit 4 outputs, as a detection result, sets of the coordinates (x, y) of the detection region and the degrees of certainty acquired so far.

Figure 10:
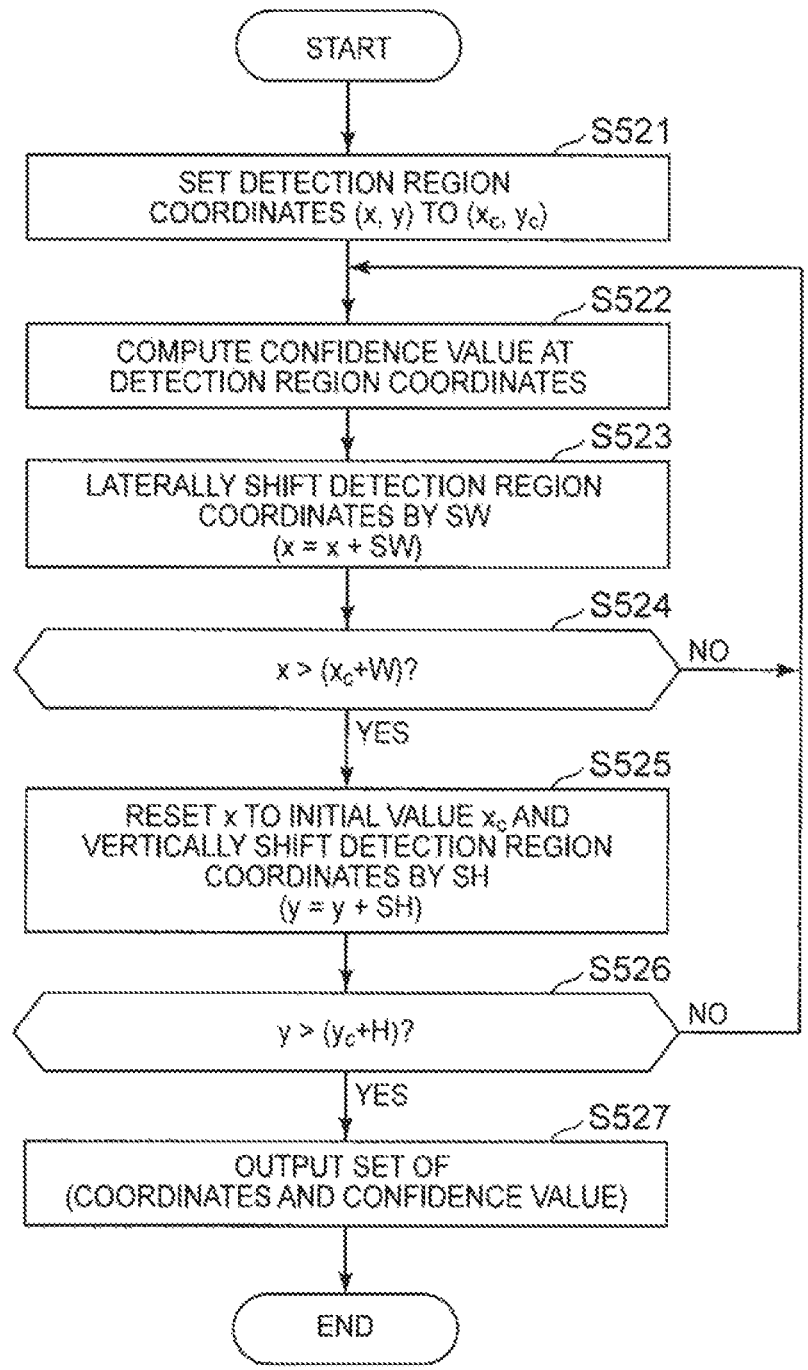
FIG. 10 is a flowchart showing an example of a processing flow of sliding window processing (across a partial region).

Further, FIG. 10 is a flowchart showing an example of the processing flow of the sliding window processing to be performed by the object detection unit 4. Note that the present example is an example of processing to be invoked when the sliding window processing is performed on the partial region of the image in the above step S302.

In the sliding window processing on the partial region of the image, the object detection unit 4 first sets the coordinates (x, y) of the detection region to ($x_c$, $y_c$) as shown in FIG. 10 (step S521). Herein, the coordinates (x, y) denotes center coordinates of the detection region, but the center coordinates have an error equivalent to the shift threshold R. Further, it is assumed that the coordinates ($x_c$, $y_c$) are set to center coordinates of a detection region that is any one of the detection target regions that results from the previous sliding window processing.

Next, the object detection unit 4 passes the coordinates (x, y) to the degree-of-certainty computation unit 5 and acquires a confidence value of the detection region (step S522).

Next, the object detection unit 4 laterally shifts the coordinates (x, y) of the detection region by SW (step S523). Herein, x may be set to x+SW.

Next, the object detection unit 4 determines whether x is greater than $x_c$+W (step S524). When x is equal to or less than $x_c$+W (No in step S524), the processing returns to step S522, and a confidence value with updated coordinates (x, y) is acquired. On the other hand, when x is greater than $x_c$+W (Yes in step S524), the processing proceeds to step S525 to perform a sliding direction in the vertical direction.

In step S525, the object detection unit 4 resets x to the initial value $x_c$, and vertically shifts the coordinates (x, y) of the detection region by SH. Herein, x may be set to $x_c$, and y may be set to y+SH.

Then, the object detection unit 4 determines whether y is greater than $y_c$+H (step S526). When y is equal to or less than $y_c$+H (No in step S526), the processing returns to step S522, and a confidence value with updated coordinates (x, y) is acquired. On the other hand, when y is greater than $y_c$+H (Yes in step S526), it is determined that the detection processing has been performed on all target regions, and the processing proceeds to step S527.

In step S527, the object detection unit 4 outputs, as a detection result, sets of the coordinates (x, y) of the detection region and the degrees of certainty acquired so far.

Figure 11:
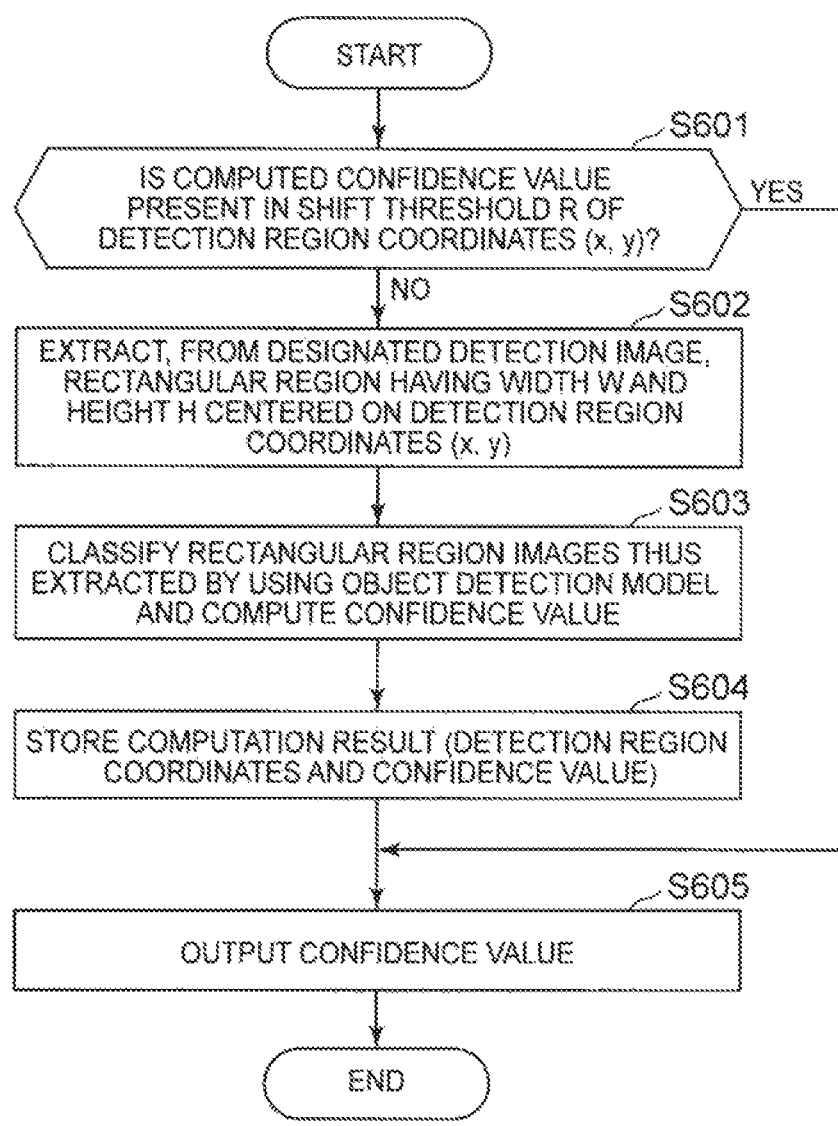
FIG. 11 is a flowchart showing an example of a processing flow of degree-of-certainty acquisition processing to be performed by a degree-of-certainty computation unit 5.

Further, FIG. 11 is a flowchart showing an example of the processing flow of the degree-of-certainty acquisition processing to be performed by the degree-of-certainty computation unit 5. As shown in FIG. 11, upon receiving the coordinates (x, y) of the detection region together with the identifier of the image, the degree-of-certainty computation unit 5 checks whether a confidence value of a detection region whose coordinates are within a distance corresponding to the shift threshold R from the coordinates (x, y) in the same image has been stored in the degree-of-certainty storage unit 6 (step S601). When such a confidence value has been stored (Yes in step S601), the confidence value is output (step S605).

On the other hand, when such a confidence value has not been stored (No in step S601), the degree-of-certainty computation unit 5 computes a confidence value on the basis of the coordinates of the detection region. The degree-of-certainty computation unit 5 extracts, from the detection image, a rectangular region having a width W and a height H centered on the coordinates (x, y) of the detection region (step S602). Specifically, a rectangular region (x−W/2, y−H/2, x+W/2, y+H/2) is extracted.

Then, the degree-of-certainty computation unit 5 classifies the rectangular region image thus extracted by using an object detection model, computes a confidence value (step S603), and stores a computation result in the degree-of-certainty storage unit 6 (step S604). Then, the processing proceeds to step S605 to output the confidence value thus computed.

As described above, according to the present exemplary embodiment, when a predetermined target object is detected from a randomly chosen detection image by using machine learning, it is possible to perform object detection with efficient computation by automatically adjusting the sliding width on the basis of an acquired confidence value to narrow down possible locations where the target object exists. Further, in such a case, it is possible to perform object detection with less determination processing by setting each appropriate detection granularity, that is, the sliding width and the detection threshold on the basis of the detection result acquired from supervised machine learning to maintain the detection accuracy allowing the average detection count.

Therefore, when detecting a predetermined target object from a randomly chosen image by using a prediction model, it is possible to achieve both the detection accuracy and an increase in efficiency of the detection processing.

Further, the use of the method according to the present exemplary embodiment of finely extracting detection regions from a detection image with a sliding window and classifying the detection regions thus extracted by using supervised machine learning into predetermined categories makes it possible to extend or screen training data to be used in machine learning.

Second Exemplary Embodiment

Next, a description will be given of a second exemplary embodiment of the present invention. According to the first exemplary embodiment, according to the detection threshold associated with the detection granularity adjusted by using the parameter adjustment image, the confidence value is computed while narrowing down the detection target region and then sliding the detection region across the detection target region, and then the final detection result is obtained. According to the present exemplary embodiment, the frequency of computation of the confidence value is reduced as compared with the method according to the first exemplary embodiment.

More specifically, according to the present exemplary embodiment, in the second and subsequent sliding processing of the second object detection processing, the detection region is shifted in a direction where the confidence value becomes higher.

Note that, in order to implement this method, the machine learning model (prediction model) is trained to output a value based on a proportion of the target object in the detection region rather than being trained to output a binary value indicating "target object is present (1)" or "target object is absent (0)".

Hereinafter, a description will be given mainly of differences from the first exemplary embodiment. The present exemplary embodiment is different from the first exemplary embodiment in method of computing a detection region initial position in the second object detection processing. That is, according to the present exemplary embodiment, the detection region is shifted relatively largely (for example, by a width equal to the size of the detection region) across the whole image, and coordinates of the detection region having a confidence value higher than the detection threshold is taken as the detection region initial position (the detection target region of the second detection processing).

Further, according to the present exemplary embodiment, in order to adjust the detection threshold, one level of adjustment granularity t is continuously used, and a configuration identical to a configuration associated with the initial granularity of the second object detection processing (for example, a configuration where the detection region is shifted by a width equal to the size of the detection region).

Further, according to the present exemplary embodiment, in the second object detection processing, a shift direction and shift amount of the detection region are determined as follows during execution of the second and subsequent detection processing. That is, a confidence value at a point in each direction (for example, eight directions including up, down, left, right, and four oblique directions) considered as a shift destination of the detection region is computed, and then the shift direction and the shift amount are determined on the basis of the confidence value thus obtained. For example, the detection region may be always shifted in a direction where the confidence value becomes highest, or alternatively, the shift direction may be stochastically determined on the basis of the confidence value. Further, for example, the higher the confidence value is, the higher the probability that the target object is nearby. Accordingly, the higher the confidence value is, the smaller the shift amount may be made, and the lower the confidence value is, the greater the shift amount may be made. Note that a configuration where, with at least one threshold prepared for the confidence value, a predetermined shift amount is set depending on whether each threshold is exceeded may be employed.

Figure 12:
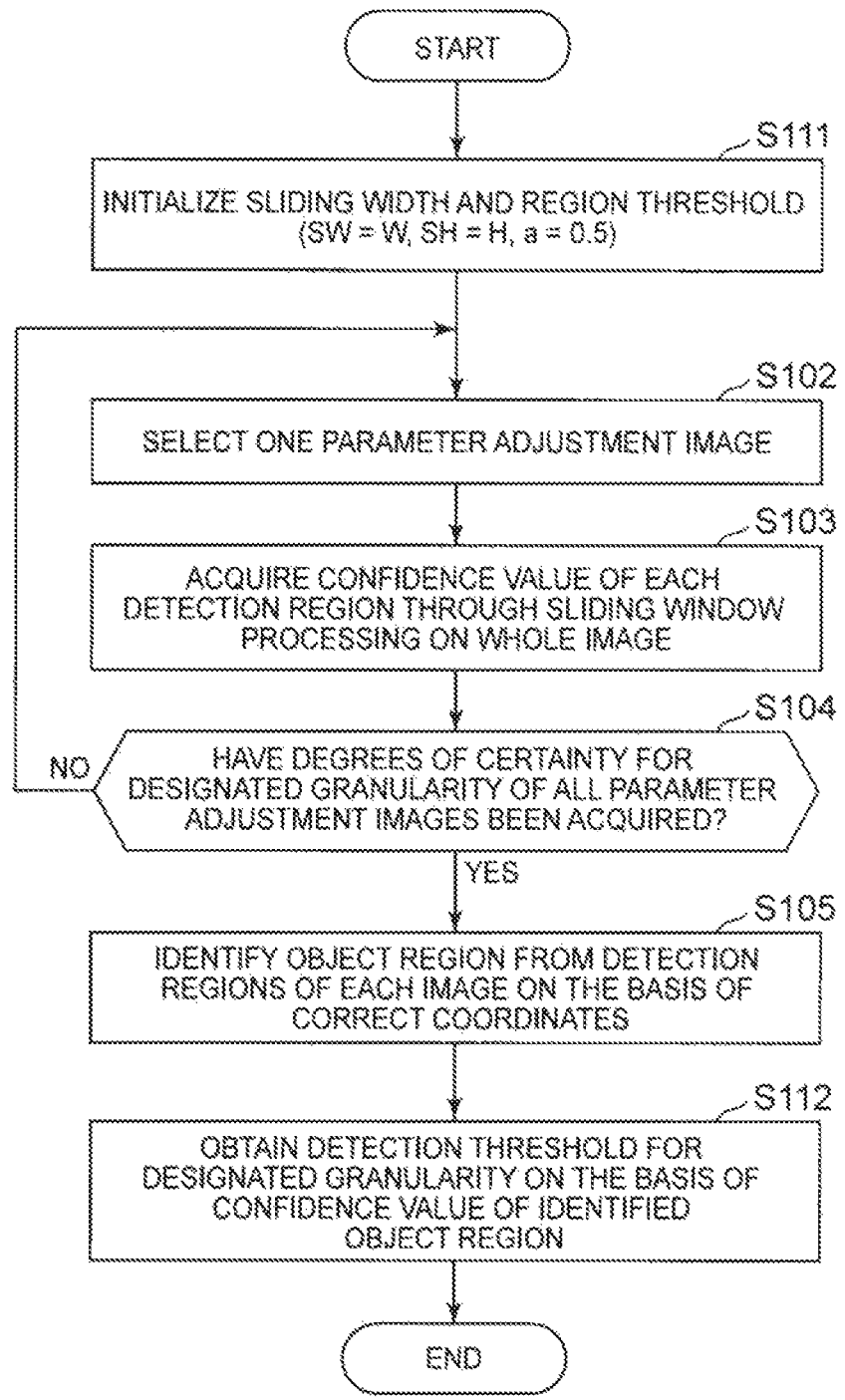
FIG. 12 is a flowchart showing an example of a processing flow of detection threshold adjustment processing of a second exemplary embodiment.

FIG. 12 is a flowchart showing an example of a processing flow of detection threshold adjustment processing according to the second exemplary embodiment. Note that the same reference numerals are given to the same operations as the operations of the detection threshold adjustment processing of the first exemplary embodiment shown in FIG. 4, and descriptions of the operations will be omitted.

In the present example, first, the object detection unit 4 performs the first object detection processing. The object detection unit 4 sets, for example, each operation parameter of the first object detection processing to a corresponding initial value (step S111). Upon receiving, for example, the detection region size W, H, initial values $SW_1$ and $SH_1$ of sliding widths SW and SH, and an initial value $a_1$ of a region threshold a to be used in the first object detection processing, the object detection unit 4 sets each operation parameter to a corresponding one of the values thus input. Further, the adjustment granularity t is set to level 1 that is an initial value.

In the example shown below, it is assumed that W, H, $SW_1$ set to W, $SH_1$ set to H, and $a_1$ set to 0.5 are input, and the operation parameters SW, SH, a, and t are set to W, H, 0.5, 1, respectively. Further, scope that denotes the detection range in the object detection processing is set to all that denotes the whole image. Note that, in the present example, only one level of adjustment granularity t is used (only t=1).

Step S102 to step S105 are the same as in the first exemplary embodiment. That is, the object detection unit 4 acquires a confidence value of each detection region for the current level of granularity from all parameter adjustment images, and the detection threshold determination unit 7 identifies an object region on the basis of the result and the correct coordinates.

Then, the detection threshold determination unit 7 determines a detection threshold for the level of granularity on the basis of the object region thus identified (step S112). In the present exemplary embodiment, the detection threshold determination unit 7 may also take a minimum value of the degrees of certainty of the object regions as the detection threshold.

Note that the parameter setting unit 9 takes the detection threshold for the level of granularity t determined in step S112 as the detection threshold for the detection granularity j=t=1 in the second object detection process. For example, the parameter setting unit 9 may generate a window configuration parameter containing information representing the granularity $t_j$ taken as the detection granularity j, and information representing SW, SH, and the detection threshold associated with the detection granularity j as information on the detection granularity j.

Figure 13:
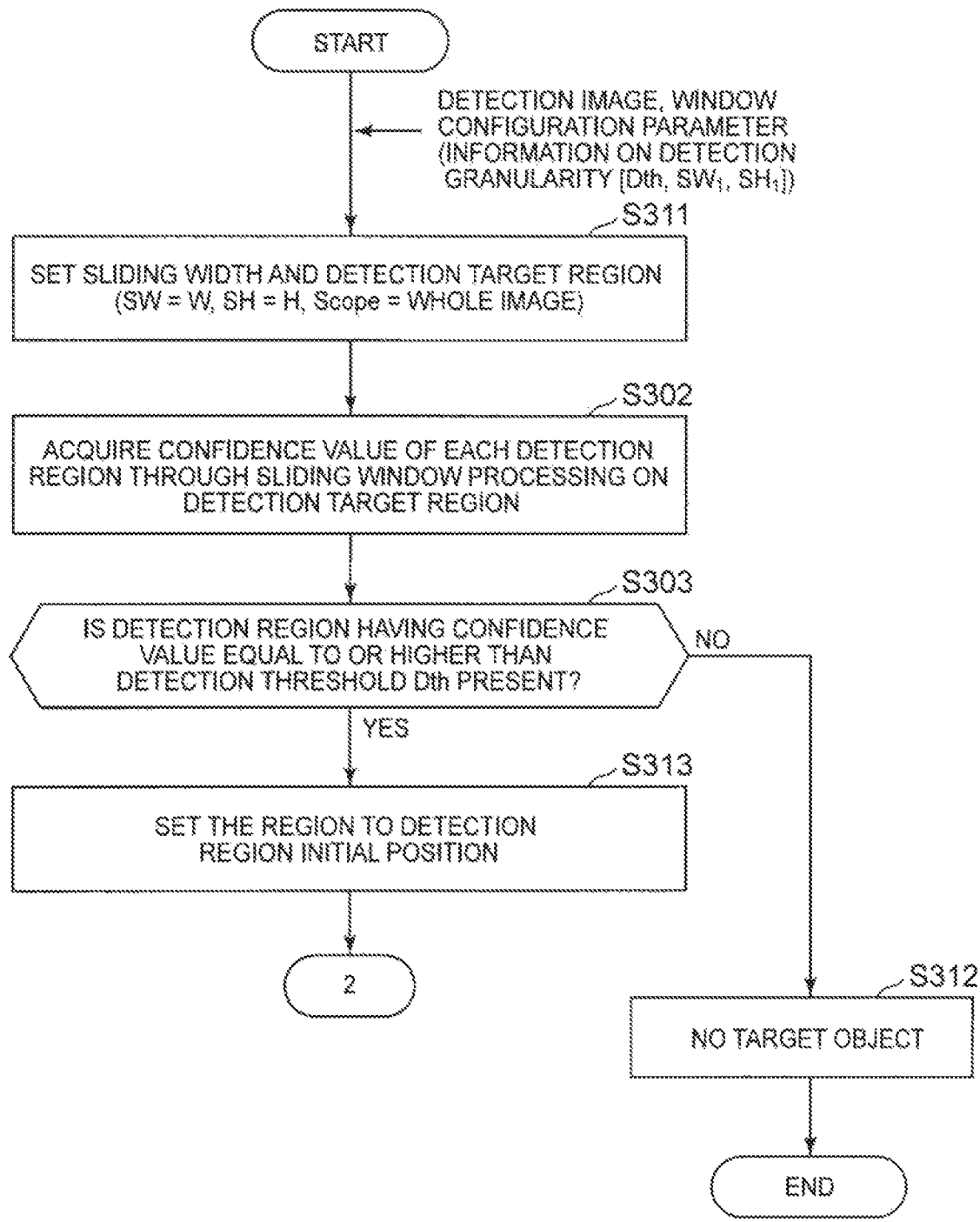
FIG. 13 is a flowchart showing an example of a processing flow of second object detection processing of the second exemplary embodiment.
Figure 14:
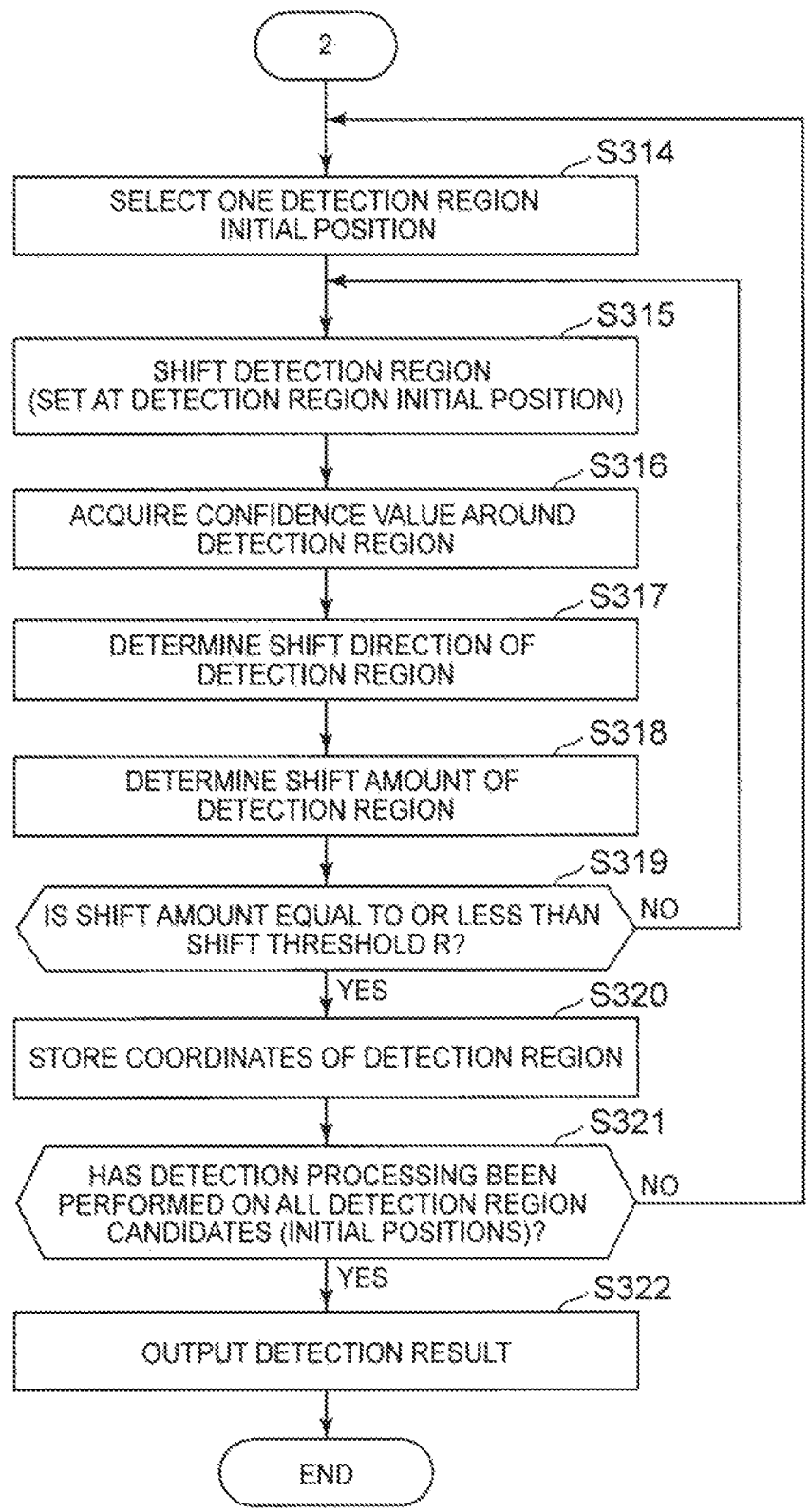
FIG. 14 is a flowchart showing an example of a subsequent processing flow of the second object detection processing of the second exemplary embodiment.

Further FIG. 13 and FIG. 14 are flowcharts showing an example of the processing flow of the second object detection processing according to the present exemplary embodiment.

According to the present exemplary embodiment, it is assumed that first, to the object detection unit 4, the window configuration parameter containing information representing SW, SH, and the detection threshold Dth associated with the detection granularity j that has been determined in the above-described window configuration parameter determination processing is input together with the detection image. When a plurality of detection images are stored in the detection image storage unit 2, the second object detection processing is invoked at least as many as the number of detection images.

Upon receiving the window configuration parameter, the object detection unit 4 sets each operation parameter of the second object detection processing to a corresponding initial value (step S311). Note that the initial value setting method is the same as in the first exemplary embodiment, except that the detection granularity j is fixed at 1. Note that, in the present example, it is assumed that SW is set to W, and SH is set to H.

The processing in step S302 and step S303 is the same as in the first exemplary embodiment.

Note that, in step S303, when no detection region whose confidence value is equal to or higher than the detection threshold Dth is present, the object detection unit 4 outputs a detection result indicating that no target object exists in the detection image and terminates the processing (No in step S303, step S312).

On the other hand, when a detection region whose confidence value is equal to or higher than the detection threshold Dth is present, the object detection unit 4 sets the detection region as the detection region initial position (step S313). Note that the processing in step S311 to step S313 may be referred to as detection region candidate initial position determination processing.

Next, the object detection unit 4 selects one detection region initial position from among the detection region initial positions set in the detection region candidate initial position determination processing (step S314), and sets the detection region at the detection region initial position (step S315).

Next, the object detection unit 4 acquires a confidence value around the detection region (step S316). For example, the object detection unit 4 may designate coordinates that result from adding a predetermined distance equal to or greater than the shift threshold R to center coordinates of the current detection region in each direction where the detection region is shiftable and acquire a confidence value from the degree-of-certainty computation unit 5.

Then, the object detection unit 4 determines a shift direction and a shift amount on the basis of the confidence value thus acquired (step S317 and step S318).

While the shift amount from the initial position is greater than the shift threshold R, the object detection unit 4 repeats the above processing (No in step S319 causes the processing to return to step S315). On the other hand, when the shift amount from the initial position becomes equal to or less than the shift threshold R (Yes in step S319), the coordinates of the detection region are stored as object coordinates in the detection result storage unit 10 (step S320).

Further, the object detection unit 4 performs the detection processing in step S315 to step S320 on all detection region candidates (No in step S321 causes the processing to return to step S314).

Finally, when the detection processing in step S315 to step S320 has been performed on all the detection region candidates, the object detection unit 4 outputs a detection result indicating that the coordinates of the detection regions stored so far are taken as the object coordinates (step S322).

As described above, according to the present exemplary embodiment, it is possible to reduce the frequency of computation of the confidence value as compared with the method according to the first exemplary embodiment.

Other Exemplary Embodiments

Note that, in the above exemplary embodiments, a description has been given of an example where a specific target object such as a ship is to be detected from a detection image, but, the above method is applicable to a case where, for example, a plurality of target objects (such as a ship, an airplane and a car, or a first ship and a second ship) are present. In such a case, the above method may be applied with objects to be classified as target objects divided into categories, and prediction models and parameter adjustment images switchable for each category.

Figure 15:
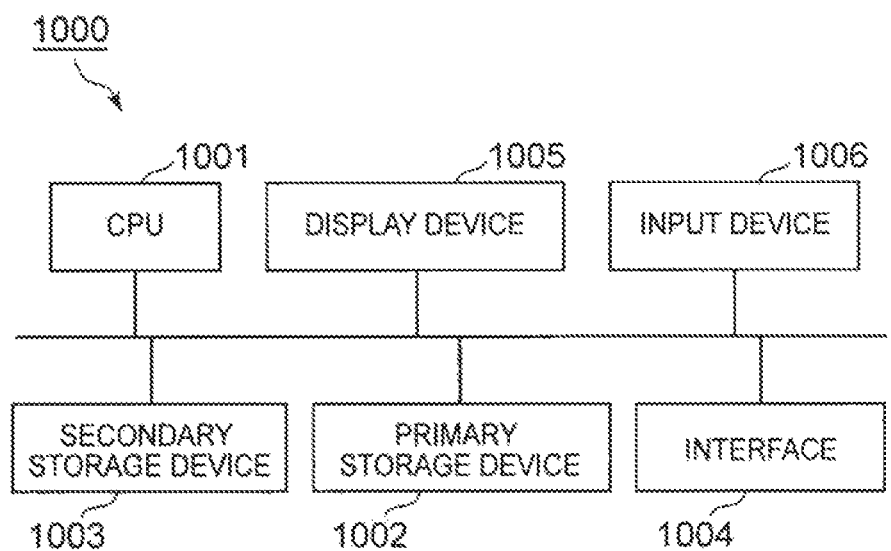
FIG. 15 is a block diagram showing a configuration example of a computer according to the exemplary embodiments of the present invention.

Next, an example of a configuration of a computer according to the exemplary embodiments of the present invention will be given. FIG. 15 is a schematic block diagram showing the configuration example of the computer according to the exemplary embodiments of the present invention. A computer 1000 includes a CPU 1001, a primary storage device 1002, a secondary storage device 1003, an interface 1004, a display device 1005, and an input device 1006.

The above-described object detection device may be implemented, for example, with the computer 1000. In such a configuration, an operation of each device may be stored in the secondary storage device 1003 in the form of a program. The CPU 1001 reads the program from the secondary storage device 1003, loads the program onto the primary storage device 1002, and executes the predetermined processing according to the above exemplary embodiments in accordance with the program.

The secondary storage device 1003 is an example of a non-transitory tangible medium. Other examples of such a non-transitory tangible medium include a magnetic disk, a magneto-optical disk, a CD-ROM, a DVD-ROM, a semiconductor memory, and the like connected via the interface 1004. Further, when this program is delivered to the computer 1000 over a communication line, the computer 1000 that has received the program may load the program onto the primary storage device 1002 and execute the predetermined processing according to the above exemplary embodiments.

Further, the program may be used for implementing part of the predetermined processing according to each exemplary embodiment. Furthermore, the program may be a differential program that implements the predetermined processing according to the above exemplary embodiments in combination with another program already stored in the secondary storage device 1003.

The interface 1004 transmits and receives information to and from other devices. Further, the display device 1005 presents information to a user. Further, the input device 1006 receives information input by the user.

Further, depending on processing contents according to the exemplary embodiments, some elements of the computer 1000 may be omitted. For example, a configuration where the device does not present information to the user makes it possible to omit the display device 1005.

Further, some or all components of each device are implemented with general-purpose or dedicated circuitry, a processor and the like, or a combination thereof. These components may be constituted by a single chip or by a plurality of chips connected via a bus. Further, some or all of the components of each device may be implemented with a combination of the above-described circuitry and the like, and the program.

In a case where some or all of the components of each device are implemented with a plurality of information processing devices, or circuitry and the like, the plurality of information processing devices, or the circuitry and the like may be arranged in a concentrated manner or in a distributed manner. For example, the information processing devices, or the circuitry and the like may be implemented in a form such as a client and server system or a cloud computing system in which nodes are connected over a communication network.

Figure 16:
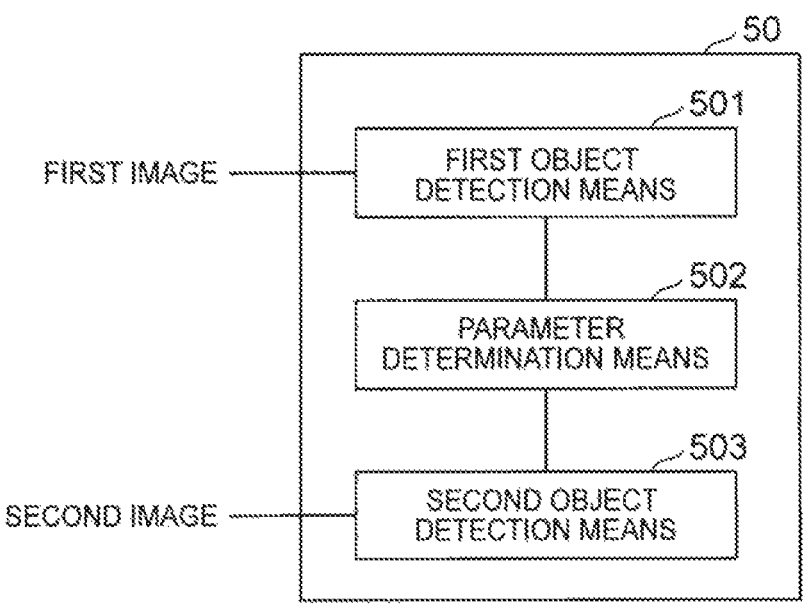
FIG. 16 is a block diagram schematically showing an object detection device of the present invention.

Further, FIG. 16 is a block diagram schematically showing an object detection device of the present invention. As shown in FIG. 16, an object detection device 50 of the present invention may include a first object detection means 501, a parameter determination means 502, and a second object detection means 503.

The first object detection means 501 (for example, a first object detection processing section of the object detection unit 4) uses a predetermined prediction model to acquire, from a known first image for which the coordinates of a detection subject are known, a confidence value with respect to each detection region extracted from a plurality of positions in the first image and indicating certainty that the detection subject exists in the detection region.

The parameter determination means 502 (for example, the detection threshold determination unit 7 and the parameter setting unit 9), on the basis of the acquired confidence value, determines parameters that include a detection threshold value which is a threshold value with respect to the confidence value, said parameters being used when detecting the detection subject from a second image in which it is not known whether the detection subject exists.

The second object detection means 503 (for example, a second object detection processing section of the object detection unit 4), on the basis of the determined parameters, narrows down detection region candidates to be used as detection region extraction sources from the entire region of a second image, and then uses the prediction model to acquire a confidence value with respect to each detection region extracted from the detection region candidates, and detects the detection subject on the basis of the acquired confidence value.

Such a configuration makes it possible to narrow down detection region candidates to possible locations where the detection subject exists in the second image, and thus makes it possible to increase, when detecting a predetermined target object from a randomly chosen image by using the prediction model, the efficiency of detection processing without a reduction in detection accuracy.

Note that the above exemplary embodiments can also be described as the following supplementary notes.

(Supplementary note 1) An object detection device includes a first object detection means configured to use a predetermined prediction model to acquire, from a known first image for which the coordinates of a detection subject are known, a confidence value with respect to each detection region extracted from a plurality of positions in the first image and indicating certainty that the detection subject exists in the detection region, a parameter determination means configured to, on the basis of the acquired confidence value, determine parameters that include a detection threshold value which is a threshold value with respect to the confidence value, said parameters being used when detecting the detection subject from a second image in which it is not known whether the detection subject exists, and a second object detection means configured to, on the basis of the determined parameters, narrow down detection region candidates to be used as detection region extraction sources from the entire region of a second image, and then use the prediction model to acquire a confidence value with respect to each detection region extracted from the narrowed-down detection region candidates, and detect the detection subject on the basis of the acquired confidence value.

(Supplementary note 2) In the object detection device described in Supplementary note 1, the parameter determination means determines the detection threshold on the basis of the confidence value acquired from the first image and the coordinates of the detection subject.

(Supplementary note 3) In the object detection device described in Supplementary note 1 or Supplementary note 2, the parameter determination means takes, as an object region, a detection region in which the detection subject occupies an area equal to or larger than a predetermined area ratio on the basis of the coordinates of the detection subject in the first image, and determines a smallest confidence value among the degrees of certainty of the object regions as the detection threshold.

(Supplementary note 4) In the object detection device described in any one of Supplementary note 1 to Supplementary note 3, for a same image, the second object detection means first takes a whole of the image as the detection region candidate and acquires the confidence value, and subsequently takes a detection region having the confidence value previously acquired equal to or higher than the detection threshold as the detection region candidate and acquires the confidence value.

(Supplementary note 5) In the object detection device described in Supplementary note 4, the first object detection means uses at least three levels of adjustment granularity associated with different sliding widths, and acquires the confidence value for each of the levels of adjustment granularity with a whole of the first image taken as the detection region candidate, the parameter determination means determines at least two levels of detection granularity and a detection threshold for each of the levels of detection granularity on the basis of the confidence value of the detection region for each of the levels of adjustment granularity acquired from the first image and the coordinates of the detection subject, and the second object detection means uses a sliding width and a detection threshold associated with a level of detection granularity selected from among the at least two levels of detection granularity in descending order of sliding width to acquire the confidence value from the detection region candidate and determine a next detection region candidate.

(Supplementary note 6) In the object detection device described in Supplementary note 5, the parameter determination means obtains a detection threshold and a number of object regions that are detection regions in which the detection subject exists for each of the levels of adjustment granularity, and determines the at least two levels of detection granularity from among the levels of adjustment granularity on the basis of an average detection count for each of the levels of the detection granularity obtained from the number of object regions.

(Supplementary note 7) In the object detection device described in Supplementary note 1 or Supplementary note 2, the first object detection means uses one level of adjustment granularity associated with a predetermined sliding width to acquire the confidence value with a whole of the first image taken as the detection region candidate, the parameter determination means obtains a detection threshold for the level of adjustment granularity on the basis of the confidence value acquired from the first image and the coordinates of the detection subject, and takes the level of adjustment granularity and the detection threshold for the level of adjustment granularity as the level of detection granularity and the detection threshold for the level of detection granularity, and for a same image, the second object detection means first takes a whole of the image as the detection region candidate, uses a sliding width and the detection threshold associated with the level of detection granularity to extract detection regions from the detection region candidate, and acquires the confidence value of each of the detection regions and determines a detection region initial position in a next detection region candidate, and subsequently takes a detection region having the confidence value previously acquired equal to or higher than the detection threshold as the detection region candidate, starts to shift the detection region from the initial position in each detection region candidate, and acquires the confidence value of a detection region after the shift while determining a shift direction and a shift amount of the detection region in each detection region candidate on the basis of the confidence value acquired from around where the detection region before the shift is located.

(Supplementary note 8) The object detection device described in any one of Supplementary note 1 to Supplementary note 7 further includes a degree-of-certainty storage means configured to store an image identifier, coordinates of a detection image, and the confidence value acquired from the detection region by using the prediction model with the image identifier, the coordinates, and the confidence value associated with each other, and a degree-of-certainty computation means configured to, upon receiving the image identifier and the coordinates of the detection region, return, when the confidence value acquired from a detection region whose coordinates are within a distance corresponding to a predetermined threshold from the received coordinates in an image identified by the received image identifier is stored in the degree-of-certainty storage means, the confidence value that has been stored, and compute, when the confidence value has not been stored, the confidence value of the detection region having the received coordinates in the image identified by the received image identifier by using the prediction model. In the object detection device, the first object detection means and the second object detection means acquire the confidence value by using the degree-of-certainty computation means.

(Supplementary note 9) An object detection method includes using a predetermined prediction model to acquire, from a known first image for which the coordinates of a detection subject are known, a confidence value with respect to each detection region extracted from a plurality of positions in the first image and indicating certainty that the detection subject exists in the detection region, on the basis of the acquired confidence value, determining parameters that include a detection threshold value which is a threshold value with respect to the confidence value, said parameters being used when detecting the detection subject from a second image in which it is not known whether the detection subject exists, on the basis of the determined parameters, narrowing down detection region candidates to be used as detection region extraction sources from the entire region of a second image, using the prediction model to acquire a confidence value with respect to each detection region extracted from the narrowed-down detection region candidates, and detecting the detection subject on the basis of the acquired confidence value.

(Supplementary note 10) An object detection program causes a computer to execute first object detection processing of using a predetermined prediction model to acquire, from a known first image for which the coordinates of a detection subject are known, a confidence value with respect to each detection region extracted from a plurality of positions in the first image and indicating certainty that the detection subject exists in the detection region, parameter determination processing of, on the basis of the acquired confidence value, determining parameters that include a detection threshold value which is a threshold value with respect to the confidence value, said parameters being used when detecting the detection subject from a second image in which it is not known whether the detection subject exists, and second object detection processing of, on the basis of the determined parameters, narrowing down detection region candidates to be used as detection region extraction sources from the entire region of a second image, using the prediction model to acquire a confidence value with respect to each detection region extracted from the narrowed-down detection region candidates, and detecting the detection subject on the basis of the acquired confidence value.

Although the invention of the present application has been described with reference to the exemplary embodiments and examples, the invention of the present application is not limited to the exemplary embodiments and examples. Various changes that can be understood by those skilled in the art can be made to the configuration and details of the invention of the present application within the scope of the invention of the present application.

This application claims priority based on Japanese Patent Application No. 2017-055679 filed on Mar. 22, 2017, the disclosure of which is incorporated herein in its entirety.

INDUSTRIAL APPLICABILITY

The present invention is suitably applicable to a case of detecting a detection target object by using a prediction model other than a learned machine learning model.

REFERENCE SIGNS LIST

100 Object detection device
1 Detection model storage unit
2 Detection image storage unit
3 Parameter adjustment image storage unit
4 Object detection unit
5 Degree-of-certainty computation unit
6 Degree-of-certainty storage unit
7 Detection threshold determination unit
8 Detection threshold storage unit
9 Parameter setting unit
10 Detection result storage unit
1000 Computer
1001 CPU
1002 Primary storage device
1003 Secondary storage device
1004 Interface
1005 Display device
1006 Input device
50 Object detection device
501 First object detection means
502 Parameter determination means
503 Second object detection means

What is claimed is:

1. An object detection device comprising:
at least one memory configured to store instructions; and
at least one processor configured to execute the instructions to:
use a predetermined prediction model to acquire, from a known first image for which the coordinates of a detection subject are known, a confidence value with respect to each detection region extracted from a plurality of positions in the first image and indicating certainty that the detection subject exists in the detection region,
on the basis of the acquired confidence value, determine parameters that include a detection threshold value which is a threshold value with respect to the confidence value, said parameters being used when detecting the detection subject from a second image in which it is not known whether the detection subject exists, and
on the basis of the determined parameters, narrow down detection region candidates to be used as detection region extraction sources from the entire region of a second image, and then use the prediction model to acquire the confidence value with respect to each detection region extracted from the narrowed-down detection region candidates, and detect the detection subject on the basis of the acquired confidence value.

2. The object detection device according to claim 1, wherein the at least one processor is further configured to execute the instructions to determine the detection threshold on the basis of the confidence value acquired from the first image and the coordinates of the detection subject.

3. The object detection device according to claim 1, wherein the at least one processor is further configured to execute the instructions to take, as an object region, a detection region in which the detection subject occupies an area equal to or larger than a predetermined area ratio on the basis of the coordinates of the detection subject in the first image, and determine a smallest confidence value among degrees of certainty of the object regions as the detection threshold.

4. The object detection device according to claim 1, wherein for a same image, the at least one processor is further configured to execute the instructions to first take a whole of the image as the detection region candidate and acquire the confidence value, and subsequently take a detection region having the confidence value previously acquired equal to or higher than the detection threshold as the detection region candidate and acquire the confidence value.

5. The object detection device according to claim 4, wherein the at least one processor is further configured to execute the instructions to:

use at least three levels of adjustment granularity associated with different sliding widths, and acquire the confidence value for each of the levels of adjustment granularity with a whole of the first image taken as the detection region candidate, determine at least two levels of detection granularity and a detection threshold for each of the levels of detection granularity on the basis of the confidence value of the detection region for each of the levels of adjustment granularity acquired from the first image and the coordinates of the detection subject, and use a sliding width and a detection threshold associated with a level of detection granularity selected from among the at least two levels of detection granularity in descending order of sliding width to acquire the confidence value from the detection region candidate and determine a next detection region candidate.

6. The object detection device according to claim 5, wherein the at least one processor is further configured to execute the instructions to obtain a detection threshold and a number of object regions that are detection regions in which the detection subject exists for each of the levels of adjustment granularity, and determine at least two levels of detection granularity from among the levels of adjustment granularity on the basis of an average detection count for each of the levels of the detection granularity obtained from the number of object regions.

7. The object detection device according to claim 1, wherein the at least one processor is further configured to execute the instructions to:

use one level of adjustment granularity associated with a predetermined sliding width to acquire the confidence value with a whole of the first image taken as the detection region candidate, obtain a detection threshold for the level of adjustment granularity on the basis of the confidence value acquired from the first image and the coordinates of the detection subject, and take the level of adjustment granularity and the detection threshold for the level of adjustment granularity as the level of detection granularity and the detection threshold for the level of detection granularity, and for a same image, first take a whole of the image as the detection region candidate, use a sliding width and the detection threshold associated with the level of detection granularity to extract detection regions from the detection region candidate, and acquire the confidence value of each of the detection regions and determine a detection region initial position in a next detection region candidate, and subsequently take a detection region having the confidence value previously acquired equal to or higher than the detection threshold as the detection region candidate, start to shift the detection region from the initial position in each detection region candidate, and acquire the confidence value of a detection region after the shift while determining a shift direction and a shift amount of the detection region in each detection region candidate on the basis of the confidence value acquired from around where the detection region before the shift is located.

8. The object detection device according to claim 1, wherein the at least one processor is further configured to execute the instructions to:

store an image identifier, coordinates of a detection image, and the confidence value acquired from the detection region by using the prediction model with the image identifier, the coordinates, and the confidence value associated with each other, and upon receiving the image identifier and the coordinates of the detection region, return, when the confidence value acquired from a detection region whose coordinates are within a distance corresponding to a predetermined threshold from the received coordinates in an image identified by the received image identifier is stored, the confidence value that has been stored, and compute, when the confidence value has not been stored, the confidence value of the detection region having the received coordinates in the image identified by the received image identifier by using the prediction model.

9. An object detection method comprising:

using a predetermined prediction model to acquire, from a known first image for which the coordinates of a detection subject are known, a confidence value with respect to each detection region extracted from a plurality of positions in the first image and indicating certainty that the detection subject exists in the detection region;

on the basis of the acquired confidence value, determining parameters that include a detection threshold value which is a threshold value with respect to the confidence value, said parameters being used when detecting the detection subject from a second image in which it is not known whether the detection subject exists;

on the basis of the determined parameters, narrowing down detection region candidates to be used as detection region extraction sources from the entire region of a second image;

using the prediction model to acquire the confidence value with respect to each detection region extracted from the narrowed-down detection region candidates; and detecting the detection subject on the basis of the acquired confidence value.

10. A non-transitory computer-readable recording medium having recorded therein an object detection program causing a computer to execute:

first object detection processing of using a predetermined prediction model to acquire, from a known first image for which the coordinates of a detection subject are known, a confidence value with respect to each detection region extracted from a plurality of positions in the first image and indicating certainty that the detection subject exists in the detection region;

parameter determination processing of, on the basis of the acquired confidence value, determining parameters that include a detection threshold value which is a threshold value with respect to the confidence value, said parameters being used when detecting the detection subject from a second image in which it is not known whether the detection subject exists; and second object detection processing of, on the basis of the determined parameters, narrowing down detection region candidates to be used as detection region extraction sources from the entire region of a second image, using the prediction model to acquire the confidence value with respect to each detection region extracted from the narrowed-down detection region candidates, and detecting the detection subject on the basis of the acquired confidence value.

11. The object detection device according to claim 2, wherein the at least one processor is further configured to execute the instructions to take, as an object region, a detection region in which the detection subject occupies an area equal to or larger than a predetermined area ratio on the basis of the coordinates of the detection subject in the first image, and determine a smallest confidence value among the degrees of certainty of the object regions as the detection threshold.

12. The object detection device according to claim 2, wherein for a same image, the at least one processor is further configured to execute the instructions to first take a whole of the image as the detection region candidate and acquire the confidence value, and subsequently take a detection region having the confidence value previously acquired equal to or higher than the detection threshold as the detection region candidate and acquire the confidence value.

13. The object detection device according to claim 3, wherein for a same image, the at least one processor is further configured to execute the instructions to first take a whole of the image as the detection region candidate and acquire the confidence value, and subsequently take a detection region having the confidence value previously acquired equal to or higher than the detection threshold as the detection region candidate and acquire the confidence value.

14. The object detection device according to claim 11, wherein for a same image, the at least one processor is further configured to execute the instructions to first take a whole of the image as the detection region candidate and acquire the confidence value, and subsequently take a detection region having the confidence value previously acquired equal to or higher than the detection threshold as the detection region candidate and acquire the confidence value.

15. The object detection device according to claim 12, wherein the at least one processor is further configured to execute the instructions to:

use at least three levels of adjustment granularity associated with different sliding widths, and acquire the confidence value for each of the levels of adjustment granularity with a whole of the first image taken as the detection region candidate, determine at least two levels of detection granularity and a detection threshold for each of the levels of detection granularity on the basis of the confidence value of the detection region for each of the levels of adjustment granularity acquired from the first image and the coordinates of the detection subject, and use a sliding width and a detection threshold associated with a level of detection granularity selected from among the at least two levels of detection granularity in descending order of sliding width to acquire the confidence value from the detection region candidate and determine a next detection region candidate.

16. The object detection device according to claim 13, wherein the at least one processor is further configured to execute the instructions to:

use at least three levels of adjustment granularity associated with different sliding widths, and acquire the confidence value for each of the levels of adjustment granularity with a whole of the first image taken as the detection region candidate, determine at least two levels of detection granularity and a detection threshold for each of the levels of detection granularity on the basis of the confidence value of the detection region for each of the levels of adjustment granularity acquired from the first image and the coordinates of the detection subject, and use a sliding width and a detection threshold associated with a level of detection granularity selected from among the at least two levels of detection granularity in descending order of sliding width to acquire the confidence value from the detection region candidate and determine a next detection region candidate.

17. The object detection device according to claim 14, wherein the at least one processor is further configured to execute the instructions to:

use at least three levels of adjustment granularity associated with different sliding widths, and acquire the confidence value for each of the levels of adjustment granularity with a whole of the first image taken as the detection region candidate, determine at least two levels of detection granularity and a detection threshold for each of the levels of detection granularity on the basis of the confidence value of the detection region for each of the levels of adjustment granularity acquired from the first image and the coordinates of the detection subject, and use a sliding width and a detection threshold associated with a level of detection granularity selected from among the at least two levels of detection granularity in descending order of sliding width to acquire the confidence value from the detection region candidate and determine a next detection region candidate.

18. The object detection device according to claim 15, wherein
the at least one processor is further configured to execute the instructions to obtain a detection threshold and a number of object regions that are detection regions in which the detection subject exists for each of the levels of adjustment granularity, and determine at least two levels of detection granularity from among the levels of adjustment granularity on the basis of an average detection count for each of the levels of the detection granularity obtained from the number of object regions.

19. The object detection device according to claim 16, wherein
the at least one processor is further configured to execute the instructions to obtain a detection threshold and a number of object regions that are detection regions in which the detection subject exists for each of the levels of adjustment granularity, and determine at least two levels of detection granularity from among the levels of adjustment granularity on the basis of an average detection count for each of the levels of the detection granularity obtained from the number of object regions.

20. The object detection device according to claim 17, wherein
the at least one processor is further configured to execute the instructions to obtain a detection threshold and a number of object regions that are detection regions in which the detection subject exists for each of the levels of adjustment granularity, and determine at least two levels of detection granularity from among the levels of adjustment granularity on the basis of an average detection count for each of the levels of the detection granularity obtained from the number of object regions.

\* \* \* \* \*